3,188,313
1-[(1-, 2- AND 3-INDOLYL)-LOWER]PIPERAZINE DERIVATIVES AND INTERMEDIATES AND PROCESSES FOR THE PREPARATION THEREOF
Sydney Archer, Bethlehem, N.Y., assignor to Sterling Drug Inc., New York, N.Y., a corporation of Delaware
No Drawing. Filed Sept. 25, 1959, Ser. No. 842,203
69 Claims. (Cl. 260—268)

This invention relates to 1-[(1-, 2- or 3-indolyl)-lower-alkyl]piperazines, 1-[(1-, 2- or 3-indolyl)-lower-alkyl]homopiperazines, 1 - [ω - (3 - indolyl)-ω-hydroxy-lower-alkyl]piperazines, 1 - [ω - (3 - indolyl) - ω-hydroxy-lower-alkyl]homopiperazines, their acid-addition and quaternary ammonium salts and to intermediates and processes for the preparation thereof.

3-indolyl-lower-alkylamines are known. The invention here resides in the concept of attaching a 1-piperazinyl-lower-alkyl group or a 1-homopiperazinyl-lower-alkyl group to the 1-, 2-, or 3-position of the indole nucleus or a 1-piperazinyl-ω-hydroxy-lower-alkyl group or a 1-homopiperazinyl-ω-hydroxy-lower-alkyl group to the 3-position of the indole nucleus. It is also concerned with certain novel intermediates and with processes for making such intermediates and for making said 1-[(1-, 2- and 3-indolyl)-lower-alkyl]piperazines, 1-[1-, 2- or 3-indolyl)-lower-alkyl]homopiperazines, 1-[ω-(3-indolyl)-ω-hydroxy-lower-alkyl]-piperazines and 1-[ω-(3-indolyl)-ω-hydroxy-loweralkyl]homopiperazines.

A preferred aspect of my invention relates to compounds having the formulae:

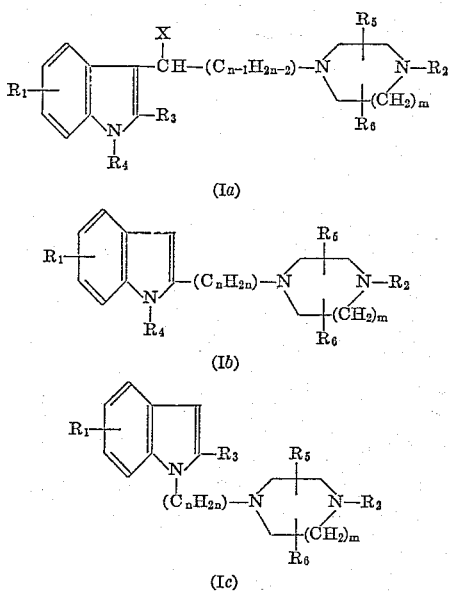

wherein $R_1$ is a hydrogen atom or one or more substituents selected from the group consisting of halogen (including fluorine, chlorine, bromine and iodine), lower-alkyl, lower-alkoxy, hydroxy, methylenedioxy, ethylenedioxy, lower-alkylmercapto, lower-alkylsulfinyl, lower-alkyl-sulfonyl, trifluoromethyl, monocarbocyclic aryl-lower-alkoxy and lower-alkanoyloxy; $R_2$ is a hydrogen atom or a lower-alkyl, hydroxy-lower-alkyl, monocarbocyclic aryl, moncarbocyclic aryl-lower-alkyl, bis(monocarbocyclic aryl)-lower-alkyl, monocarbocyclic aryl-lower-alkenyl or heteromonocyclic radical; $R_3$ is a hydrogen atom or a lower-alkyl or monocarbocyclic aryl radical; $R_4$ is a hydrogen atom or a lower-alkyl, monocarbocyclic aryl, monocarbocyclic aryl-lower-alkyl or a monocarbocyclic aryl-lower-alkenyl radical; $R_5$ and $R_6$ are hydrogen atoms or each of $R_5$ and $R_6$ can represent a lower-alkyl radical or one of $R_5$ and $R_6$ can represent a lower-alkyl radical while the other of $R_5$ and $R_6$ represents a hydrogen atom; X is a hydrogen atom or the hydroxyl radical and represents the hydroxyl radical only when the hydroxyl radical and the 1-nitrogen atom of the piperazine ring are separated by at least two carbon atoms, that is when n in Formula Ia is at least 2; n represents an integer from one to seven; and m represents the integers 1 or 2.

In the above general Formulae Ia, b and c, $R_1$ represents a hydrogen atom or one or more substituents selected from the group consisting of halogen, lower-alkyl, lower-alkoxy, hydroxy, methylene-dioxy, ethylenedioxy, lower-alkylmercapto, lower-alkylsulfinyl, lower-alkylsulfonyl, trifluoromethyl, monocarbocyclic aryl-lower-alkoxy and lower-alkanoyloxy. $R_1$ can represent from one to four of the above substituents which can be on any of the four available positions on the benzene ring, and when more than one substituent is present, they can be the same or different. When $R_1$ represents a lower-alkyl, lower-alkoxy, lower-alkylmercapto, lower-alkyl-sulfinyl, lower-alkylsulfonyl or lower-alkanoyloxy radical, it can be either straight or branched and can contain from one to about five carbon atoms, and when $R_1$ represents a monocarbocyclic aryl-lower-alkoxy radical, it can contain from seven to about ten carbon atoms and can be further substituted by from one to three substituents of the nature named above, i.e., halogen, lower-alkyl, lower-alkoxy, hydroxy, methylenedioxy, ethylenedioxy, lower-alkyl-mercapto, lower-alkylsulfinyl, lower-alkylsulfonyl, trifluoromethyl and lower-alkanoyloxy. $R_1$ thus stands, inter alia, for fluoro, chloro, bromo, iodo, methyl, ethyl, butyl, methoxy, dimethoxy, trimethoxy, ethoxy, ethoxy-methoxy, butoxy, hydroxy, methylenedioxy, ethylenedioxy, methylmercapto, isopropylmercapto, methylsulfinyl, isopropylsulfinyl, methylsulfonyl, isopropylsulfonyl, trifluoromethyl, benzyloxy, 3,4,5-trimethoxybenzyloxy, acetoxy or isobutyryloxy.

In the above general Formulae, Ia, b and c, $R_2$ represents a hydrogen atom or a lower-alkyl, hydroxy-lower-alkyl, monocarbocyclic aryl, monocarbocyclic aryl lower-alkyl, bis(monocarbocyclic aryl)-lower-alkyl, monocarbocyclic aryl-lower-alkenyl or heteromonocyclic radical; $R_3$ represents a hydrogen atom or a lower-alkyl or monocarbocyclic aryl radical; and $R_4$ represents a hydrogen atom or a lower-alkyl, monocarbocyclic aryl, monocarbocyclic aryl-lower-alkyl or monocarbocyclic aryl-lower-alkenyl radical. When $R_2$, $R_3$ or $R_4$ represents a lower-alkyl radical, it can be straight or branched and can contain from one to about six carbon atoms. $R_2$, $R_3$ and $R_4$ thus stand, inter alia, for methyl, isopropyl, isobutyl or n-hexyl.

When $R_2$ represents an hydroxy-lower-alkyl radical, it can be straight or branched, can contain from two to about six carbon atoms and is such that the oxygen and nitrogen atoms are separated by at least two carbon atoms. $R_2$ thus also stands, inter alia, for 2-hydroxyethyl, 3-hydroxy-1-methylpropyl or 6-hydroxyhexyl.

When $R_2$, $R_3$ or $R_4$ represents a monocarbocyclic aryl radical, or when $R_2$ or $R_4$ represents a monocarbocyclic aryl-lower-alkyl or a monocarbocyclic aryl-lower-alkenyl radical or when $R_2$ represents a bis(monocarbocyclic aryl)-lower-alkyl radical, each lower-alkyl and lower-alkenyl moiety of said radicals can contain up to about four carbon atoms and each monocarbocyclic aryl moiety of said radicals can be further substituted as will be hereinafter described and each monocarbocyclic aryl moiety, together with said substituents, can contain from six to about twelve carbon atoms. The monocarbocyclic aryl moiety can thus be phenyl or phenyl substituted by one or more substituents selected from the group consisting of halogen (including fluorine, chlorine, bromine and iodine), lower-alkyl, hydroxy, lower-alkoxy, methylenedioxy, ethylenedioxy, lower-alkylmercapto, lower-alkylsulfinyl, lower-alkylsulfonyl and trifluoromethyl. When the monocarbocyclic aryl moiety is substituted by more than one of the above substituents, the substituents can be the same or different and can occupy any of the available positions on the phenyl ring. When the substituent is a lower-alkyl, lower-alkoxy, lower-alkylmercapto, lower-alkylsulfinyl or lower-alkylsulfonyl group, said substituents can be either straight or branched and can contain from one to about four carbon atoms. Thus when $R_2$, $R_3$ or $R_4$ represents a monocarbocyclic aryl, monocarbocyclic aryl-lower-alkyl, bis(monocarbocyclic aryl)-lower-alkyl or a monocarbocyclic aryl-lower-alkenyl radical, each of $R_2$, $R_3$ and $R_4$ can represent such organic radicals, inter alia, as phenyl, benzyl, phenethyl, 4-phenylbutyl, benzhydryl or cinnamyl or such organic radicals substituted in the phenyl ring by one or more of such substituents, inter alia, as fluoro, chloro, bromo, iodo, methyl, isobutyl, hydroxy, methoxy, n-butoxy, methylenedioxy, ethylenedioxy, methylmercapto, isopropylmercapto, methylsulfinyl, isopropylsulfinyl, methylsulfonyl, isopropylsulfonyl or trifluoromethyl.

In the above general Formulae I$a$, $b$ and $c$ when $R_2$ represents a heteromonocyclic radical, it can represent a heteromonocyclic radical containing one or more heteroatoms such as nitrogen, oxygen or sulfur. Thus $R_2$ also stands, inter alia, for pyrimidyl, pyrazinyl, pyridyl, thiazolyl, oxazolyl, 1,3,5-triazinyl, thienyl, and the like.

In the above general Formulae I$a$, $b$ and $c$, $R_5$ and $R_6$ represent hydrogen atoms or each of $R_5$ and $R_6$ can represent a lower-alkyl radical or one of $R_5$ and $R_6$ can represent a lower-alkyl radical while the other of $R_5$ and $R_6$ represents a hydrogen atom. When $R_5$ and $R_6$ represent lower-alkyl radicals, they can contain from one to about three carbon atoms, can be straight or branched and can occupy either the 2-, 3-, 5- or 6-position of the piperazine ring or the 2-, 3-, 5-, 6- or 7-positions of the homopiperazine ring. $R_5$ and $R_6$ thus stand for hydrogen, methyl, ethyl, n-propyl or isopropyl.

In the above general Formulae I$a$, $b$ and $c$, $n$ represents an integer from one to seven and, in Formula I$a$ when X is a hydroxyl radical, must be at least two. The lower-alkylene group, $C_nH_{2n}$, can be straight or branched and stands, inter alia, for methylene, ethylene, propylene, butylene, 2-methylproplylene, 2-methylbutylene, 2-ethylbutylene, 2-ethylpentylene and the like.

The compounds of the present invention can be prepared by the following reactions in which $R_1$, $R_2$, $R_3$, $R_4$, $R_5$, $R_6$ X, $n$ and $m$ have the meanings given above, except that $R_2$ does not represent a hydrogen atom and Hal represents a halogen atom and Alk represents a lower-alkyl radical. The compounds of Formulae I$a$, $b$ and $c$ where $R_2$ represents a hydrogen atom are prepared in a manner as will be hereinafter described.

METHOD A

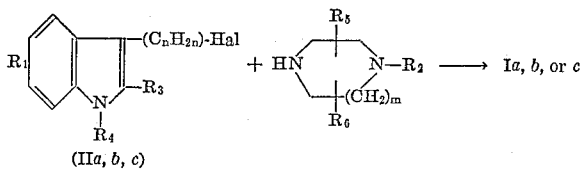

(II$a, b, c$)

METHOD B

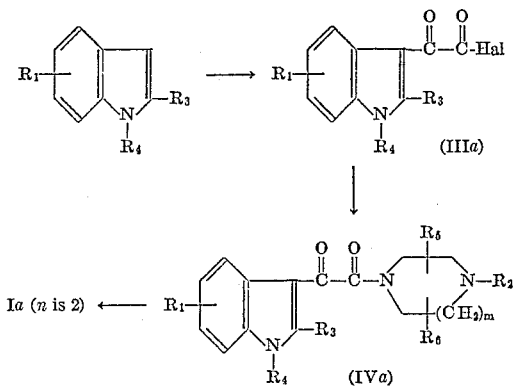

METHOD C

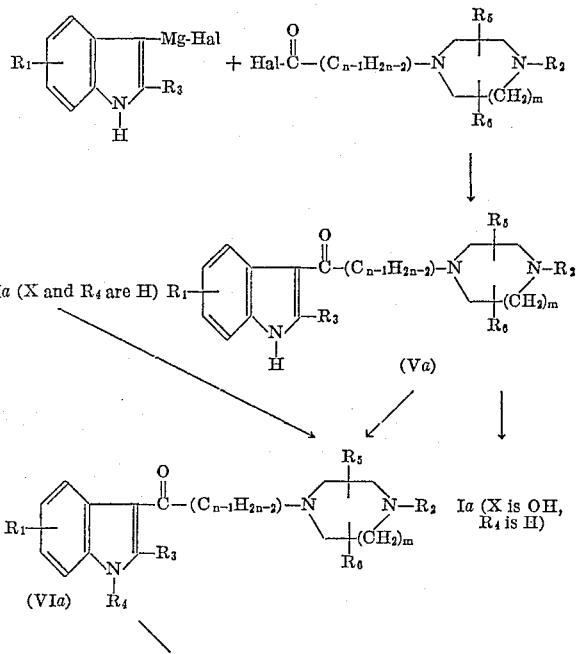

METHOD D

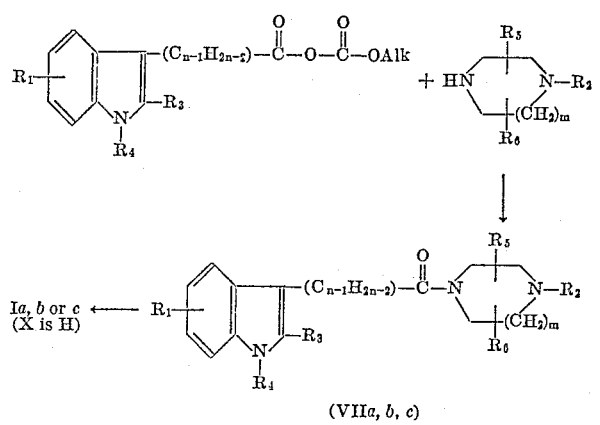

METHOD E

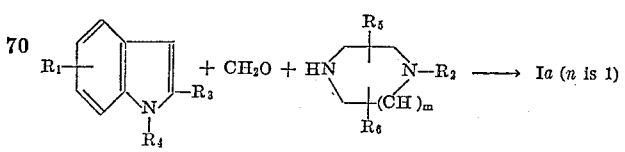

Method A above can be used to prepare 1-[(1-, 2- and 3-indolyl)-lower alkyl]-4-substituted-piperazines and 1-[(1-, 2- and 3-indolyl)-lower-alkyl]-4-substituted homopiperazines of Formula Ia, b or c where X in Formula Ia is a hydrogen atom. The intermediate indolyl-lower-alkyl halides of Formula IIa, b or c, used as starting materials in Method A above, are prepared by reduction of an indolyl 2- or 3-carboxylic acid or an indole 1-, 2-, or 3-alkanoic acid with lithium aluminum hydride and conversion of the resulting alcohol to the corresponding halide by reacting the former with, for example, a phosphorus trihalide or a thionyl halide. The (1-, 2- and 3-indolyl)-lower-alkyl halides thus produced are reacted with an appropriate 1-substituted-piperazine or 1-substituted homopiperazine at a temperature between about 50° C. and 150° C. in the presence of an acid-acceptor. The reaction is preferably carried out in an organic solvent, inert under the conditions of the reaction, such as anhydrous ethanol, benzene, xylene and the like. The purpose of the acid-acceptor is to take up the hydrogen halide which is split out during the course of the reaction. The acid-acceptor is a basic substance which forms water soluble by-products easily separable from the main product of the reaction and includes such substances as alkali metal salts of weak acids, e.g., sodium carbonate, sodium bicarbonate, potassium carbonate, sodium acetate, sodium alkoxides, and the like. The acid-acceptor can also be in the form of an excess quantity of the 1-substituted-piperazine or 1-substituted-homopiperazine.

The compounds of Formula Ia where X is H and $n$ is at least 2 can also be prepared by reacting an indole with a 1-($\omega$-hydroxy-lower-alkyl)-4-substituted piperazine or a 1-($\omega$-hydroxy-lower-alkyl)-4-substituted-homopiperazine in the presence of a Raney nickel catalyst. The reaction is preferably carried out in an organic solvent inert under the conditions of the reaction, such as xylene, cymene or di-n-butyl ether, and the like.

Method B above can be used to prepare 1-[2-(3-indolyl)-ethyl - 4 - substituted-piperazines, 1-[2-(3-indolyl)ethyl]-4-substituted-homopiperazines, 1-[2-(3-indolyl)-2-hydroxyethyl] - 4 - substituted-piperazines and 1-[2-(3-indolyl) - 2 - hydroxyethyl]-4-substituted-homopiperazines, i.e. compounds of formula Ia where $n$ is 2 and X is a hydrogen atom or a hydroxyl radical. The intermediate indoles used as starting materials in Method B above are prepared by known methods, for example by the Fischer indole synthesis using an appropriate substituted phenylhydrazine and a methyl lower-alkyl ketone or a methyl monocarbocyclic aryl ketone. Alternatively the starting indoles can be prepared by catalytic reduction of a $\beta$,2-dinitrostyrene. The indoles thus prepared are reacted with a glyoxalyl halide at a temperature in the range from about —20° C. to 25° C. in an organic solvent inert under the conditions of the reaction, such as ether, petroleum ether, dioxane, tetrahydrofuran and the like, thus affording the 3-(indolyl)-glyoxalyl halides of Formula IIIa. A preferred solvent is ether. The 3-(indolyl)glyoxalyl halides of Formula IIIa thus prepared are then reacted with a 1-substituted-piperazine or a 1-substituted-homopiperazine at a temperature between about —5° C. and about 65° C. in the presence of an acid-acceptor to give the 1-[(3-indolyl)-glyoxalyl] - 4 - substituted-piperazines and 1-[(3-indolyl)glyoxalyl] - 4 - substituted-homopiperazines of Formula IVa. The reaction is preferably carried out in an organic solvent, inert under the conditions of the reaction, such as tetrahydrofuran, ether, ethylene dichloride and the like. The purpose of the acid-acceptor is to take up the hydrogen halide which is split out during the course of the reaction. The acid-acceptor is a basic substance which forms water-soluble by-products easily separable from the main product of the reaction and includes such substances as alkali metal salts of weak acids, e.g., sodium carbonate, sodium bicarbonate, potassium carbonate, sodium acetate, and the like. The acid-acceptor can also be in the form of an excess quantity of the 1-substituted-piperazine or 1-substituted-homopiperazine. A preferred solvent is tetrahydrofuran and it is preferred to use an excess quantity of the 1-substituted-piperazine or 1-substituted-homopiperazine as the acid-acceptor. The 1-[(3-indolyl)glyoxalyl]-4-substituted piperazines and 1-[(3-indolyl)glyoxalyl] - 4 - substituted-homopiperazines thus prepared are reacted with an alkali metal aluminum hydride at a temperature between about 0° C. and about 65° C. in an organic solvent inert under the conditions of the reaction, for example, ether or tetrahydrofuran. It is preferred to use lithium aluminum hydride in refluxing tetrahydrofuran.

Method B affords compounds of Formula I where the piperazinyl-lower-alkyl, homopiperazinyl-lower-alkyl, piperazinyl-$\omega$-hydroxy-lower-alkyl or homopiperazinyl-$\omega$-hydroxy-lower-alkyl group is attached to the 3-position of the indole nucleus. When $R_4$ in compounds of Formula IVa is a hydrogen atom, the main product is a 1-[2-(3-indolyl)ethyl]-4-substituted-piperazine or a 1-[2-(3-indolyl)ethyl]-4-substituted-homopiperazine, i.e., Ia, wherein X is H and $n$ is 2, although it is possible to obtain both 1-[2-(3-indolyl)-2-hydroxyethyl] - 4 - substituted-piperazines or 1-[2-(3-indolyl)-2-hydroxyethyl]-4-substituted homopiperazines and 1-[2-(3-indolyl)ethyl]-4-substituted-piperazines or 1-[2-(3-indolyl)ethyl]-4-substituted-homopiperazines. However, when $R_4$ in compounds of Formula IVa is a lower-alkyl, monocarbocyclic aryl, monocarbocyclic aryl-lower-alkyl or a monocarbocyclic aryl-lower-alkenyl radical, the only products obtained on reduction with an alkali metal aluminum hydride are the corresponding 1-[2-(3-indolyl)-2-hydroxyethyl]-4-substituted-piperazines and 1-[2-(3-indolyl)-2-hydroxyethyl]-4-substituted-homopiperazines, i.e., Ia, X is OH. It is nevertheless possible to obtain 1-[$\omega$-(3-indolyl)-$\omega$-hydroxy-lower-alkyl]-4-substituted-piperazines and 1-[$\omega$-(3-indolyl)-$\omega$-hydroxy-lower-alkyl]-4-substituted-homopiperazines of Formula Ia wherein $R_4$ is H by another method as will be hereinafter described.

Method C can also be used to prepare compounds of general Formula Ia where the piperazinyl-$\omega$-hydroxy-lower-alkyl group, homopiperazinyl-$\omega$-hydroxy-lower-alkyl group, piperazinyl-lower-alkyl group or the homopiperazinyl-lower-alkyl group is attached to the 3-position of the indole nucleus. The starting indole Grignard reagent is prepared by reacting an indole having no substituent in the 1-position of the indole nucleus with a lower-alkylmagnesium halide in an appropriate organic solvent, for example ether or tetrahydrofuran, and reacting the resulting indolemagnesium halide with a 4-substituted-1-piperazinyl-lower-alkanoyl halide or a 4-substituted-1-homopiperazinyl-lower-alkanoyl halide to give the 1-[$\omega$-(3-indolyl)-$\omega$-keto-lower-alkyl]-4-substituted-piperazines and 1-[$\omega$-(3-indolyl)-$\omega$-keto-lower-alkyl] - 4 - substituted-homo-piperazines of Formula Va. The latter on reaction with an alkali metal aluminum hydride as described above, preferably lithium aluminum hydride, afford 1-[$\omega$-(3-indolyl)-lower-alkyl]-4-substituted-piperazines and 1-[$\omega$-)3-indolyl)-lower-alkyl] - 4 - substituted-homopiperazines of Formula Ia where X and $R_4$ are hydrogen atoms. However, on reaction of the 1-[$\omega$-(3-indolyl)-$\omega$-keto-lower-alkyl]-4-substituted-piperazines or the 1-[$\omega$-(3-indolyl) - $\omega$-keto-lower-alkyl]-4-substituted-homopiperazines of Formula Va with an alkali metal borohydride, 1-[$\omega$-(3-indolyl)-$\omega$-hydroxy-lower-alkyl] - 4 - substituted - piperazines and 1-[$\omega$-(3-indolyl) - $\omega$ - hydroxyl-lower-alkyl)]-4-substituted-homopiperazines can be obtained, i.e., Ia, X is OH, $R_4$ is H. The reaction is preferably carried out in an organic solvent inert under the conditions of the reaction, for example methanol, ethanol, ether, tetrahydrofuran and the like. Alternatively, the compounds of Formula Va can be reacted with a lower-alkyl halide, a monocarbocyclic aryl-lower-alkyl halide or a monocarbocyclic aryl-lower-alkenyl halide in the presence of an acid-acceptor to give the 1-[$\omega$-(3-indolyl)-$\omega$-keto-lower-alkyl]-4-substituted-piperazines and the 1-[$\omega$-(3-indolyl)-$\omega$-keto-loweralkyl]-4-substituted-homopiperazines of Formula VI*a* where R$_4$ is not a hydrogen atom. The purpose of the acid-acceptor is to take up the hydrogen halide which is split out during the course of the reaction. The reaction is preferably carried out in liquid ammonia in the presence of an alkali metal amide, for example, sodium amide. The compounds of Formula VI*a* thus prepared can then be reacted with an alkali metal aluminum hydride or an alkali metal borohydride as described above, preferably lithium aluminum hydride or sodium borohydride, to give 1-[ω-(3-indolyl)-ω-hydroxy-lower-alkyl] - 4 - substituted-piperazines and 1-[ω-(3-indolyl)-ω-hydroxy-alkyl]4-substituted-homopiperazines of Formula I*a* where X is OH.

Method D above can be used to prepare 1-[(1-, 2- and 3-indolyl)-lower-alkyl] - 4 - substituted-piperazines and 1-[(1-, 2- and 3-indolyl)-lower-alkyl]-4-substituted-homopiperazines of Formula I*a*, *b* or *c* where X is H and *n* is an integer from one to seven. The intermediate mixed anhydrides used as starting material are prepared by reacting a 1-, 2- or 3-indolyl-lower-alkanoic acid or a 2- or 3-indolecarboxylic acid with a lower-alkyl-haloformate in the presence of an acid-acceptor, for example triethylamine, at a temperature between about −20° C. to about 20° C. The reaction is preferably carried out in an organic solvent inert under the conditions of the reaction such as anhydrous acetone, ether, ethylene dichloride and the like. Acetone is the preferred solvent. The purpose of the acid-acceptor is to take up the hydrogen halide split out during the course of the reaction and is a basic substance which forms water-soluble by-products easily separable from the product. The indolyl-lower-alkane mixed anhydrides of the 1-, 2- and 3-indole-lower-alkanoic acids, and the 2-indolecarboxylic acids and 3-indolecarboxylic acids thus formed in situ are reacted with an appropriate 1-substituted-piperazine or 1-substituted-homopiperazine at a temperature between about −20° C. and about 20° C. to give the 1-[(1-, 2- and 3-indolyl)-α-keto-lower-alkyl]-4-substituted-piperazines, 1-[(1-, 2- and 3-indolyl) - α - keto-lower-alkyl]-4-substituted - homopiperazines, 1-(2-indolylcarbonyl)-4-substituted-piperazines, 1-(2 - indolylcarbonyl)-4-substituted-homopiperazines, 1-(3-indolylcarbonyl)-4-substituted-piperazines and the 1-(3-indolylcarbonyl) - 4 - substituted-homopiperazines of Formulae VII*a*, *b* and *c*. The latter on reaction with an alkali metal aluminum hydride as described above, preferably lithium aluminum hydride, afford compounds of Formula I*a*, *b* or *c* wherein X is H and *n* is an integer from one to seven.

Alternatively the 1-[(3-indolyl)-α-keto-lower-alkyl]-4-substituted-piperazines and 1-[(3 - indolyl)-α-keto-lower-alkyl] - 4 - substituted-homopiperazines of Formula VII*a* where R$_4$ is hydrogen can be prepared by reacting an indole having no substituent in the 1-position of the indole nucleus with a lower-alkyl magnesium halide in an appropriate organic solvent, for example ether or tetrahydrofuran, and reacting the resulting indole magnesium halide with a 1-(halo-lower-alkanoyl)-4-substituted-piperazine or a 1-(halo-lower alkanoyl) - 4 - substituted-homopiperazine thus producing the compounds of Formula VII*a* where R$_4$ is hydrogen and *n* is an integer from two to seven.

Method E above can be used to prepare 1-[(3-indolyl)-methyl] - 4 - substituted-piperazines and 1-[(3 - indolyl)-methyl]-4-substituted-homopiperazines, that is, compounds of Formula I*a* where X is H and *n* is 1. The 1-[(3-indolyl)methyl] - 4 - substituted-piperazines and 1-[(3 - indolyl)methyl]-4-substituted-homopiperazines are prepared by reacting an indole with formaldehyde and an appropriate 1-substituted-piperazine or 1-substituted-homopiperazine at a temperature between about 50° C. and about 150° C. The formaldehyde can be in the form of an aqueous solution, i.e., 40% formalin solution or a polymeric form of formaldehyde such as paraformaldehyde or trioxymethylene. When such polymeric forms are used, a molar excess of mineral acid such as hydrochloric acid, is added to regenerate the free aldehyde from the polymer. The reaction is preferably carried out in an organic solvent, inert under the conditions of the reaction, such as ethanol, methanol or 3-methylbutanol.

The compounds of Formula I*a*, *b* or *c* where R$_2$ is a hydrogen atom are prepared by reacting with hydrogen in the presence of a catalyst the 1-[(1-, 2- and 3-indolyl)-lower-alkyl]piperazines, 1-[(1-, 2- and 3-indolyl)-lower-alkyl]homopiperazines, 1-[ω-(3-indolyl)-ω-hydroxy-lower-alkyl]piperazines or 1 - [ω-(3 - indolyl)-ω-hydroxy-lower-alkyl]homopiperazines of Formula I*a*, *b* or *c* in which the piperazine or homopiperazine ring bears attached to the 4-position a benzyl, benzhydryl or cinnamyl radical. The reaction is preferably carried out in the presence of a platinum or palladium catalyst in an organic solvent inert under the conditions of the reaction, for example ethanol, cellosolve, benzene, toluene and the like and at hydrogen pressures in the range from about 30 p.s.i. to about 100 p.s.i. The benzyl, benzhydryl or cinnamyl radicals can be unsubstituted or substituted in the phenyl ring by substituents of the nature described above but which do not take part in or adversely affect the reaction thus excluding such substituents as those containing sulfur, for example lower-alkyl-mercapto, or halogen. A preferred catalyst is palladium-on-charcoal and a preferred solvent is ethanol.

In the procedures described above, the piperazine or homopiperazine moiety is attached as a complete ring to the indolyl moiety either through a lower-alkyl or lower-alkanoyl chain. The compounds of Formula I*a*, *b* or *c* above can also be prepared using the same general procedures as described above except that the piperazine or homopiperazine ring is closed after an N-benzyl-N-substituted-lower-alkylenediamine group has been joined to the indolyl moiety through a lower-alkylene or a lower-alkanoyl chain. The procedure is particularly adaptable to the preparation of compounds of Formula I*a*, *b* or *c* wherein R$_5$ and/or R$_6$ represent lower-alkyl radicals. The procedure is illustrated below using Method D, but it is to be understood that the other methods described above can be used as well. In the following reactions R$_1$, R$_2$, R$_3$, R$_4$, R$_5$, R$_6$, *n*, *m*, and Hal have the meanings given above.

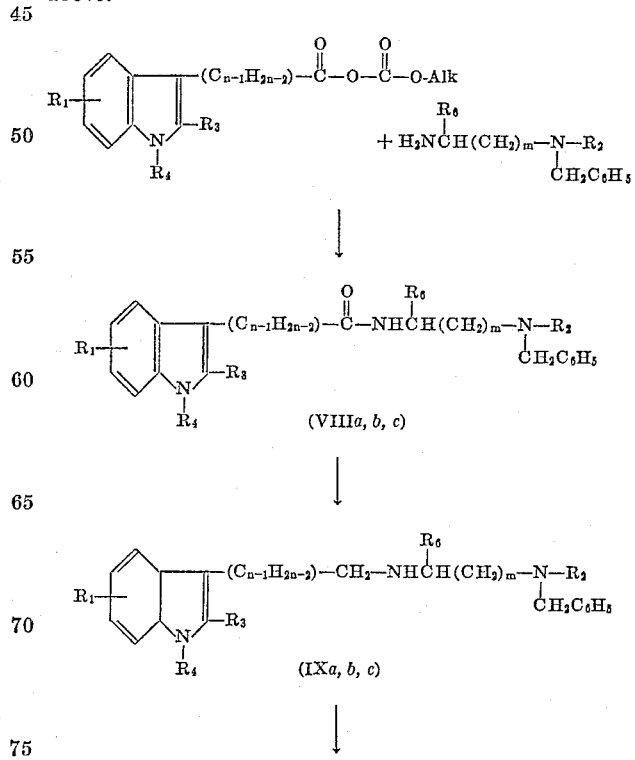

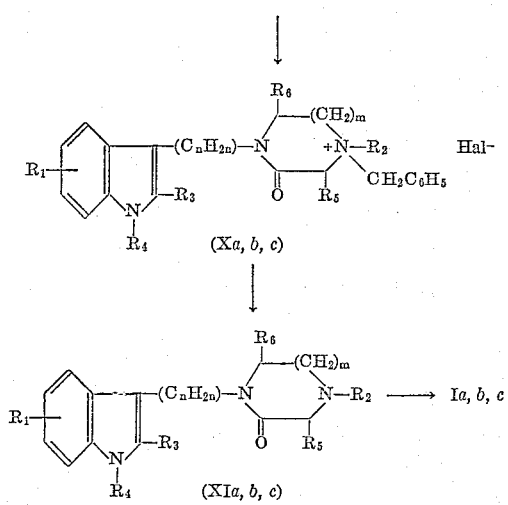

In the above procedure an N-benzyl-N-substituted-lower-alkylene diamine is reacted, in the above instance, with a mixed anhydride of a 1-, 2- or 3-indole-lower-alkanoic acid or a 2- or 3-indolecarboxylic acid using the same conditions as described above in the description of Method D for the reaction of an indolyl-lower-alkane mixed anhydride with a 1-substituted-piperazine or a 1-substituted-homopiperazine thus producing the compounds of Formula VIIIa, b or c. The lower-alkylene radical, which is an ethylene radical when m is 1 or a propylene radical when m is 2, can be further substituted by a straight or branched lower-alkyl radical, $R_6$, and the lower-alkyl radical can occupy any of the carbon atoms of the ethylene or propylene radical, although for the purpose of illustration only it is shown above in Formulae VIIIa, b and c on the carbon atom adjacent to the amide nitrogen atom. Compounds of Formulae VIIIa, b and c wherein $R_6$ is attached to the carbon atom adjacent to the amide nitrogen atom afford compounds of Formulae Ia, b and c wherein the lower-alkyl radical is attached to the 2-position of the piperazine ring or the 7-position of the homopiperazine ring. Compounds of Formulae Ia, b and c wherein the lower-alkyl radical is attached to the 3-position of the piperazine ring or the 5-position of the homopiperazine ring can be prepared using an N-benzyl-N-substituted-lower-alkylenediamine bearing a lower-alkyl radical on the carbon atom adjacent to the tertiary-amino group or by another alternative procedure as will be hereinafter described, and compounds of the Formulae Ia, b and c wherein the lower-alkyl radical is attached to the 6-position of the homopiperazine ring can be prepared using an N-benzyl-N-substituted-propylenediamine bearing a lower-alkyl radical on the 2-position of the propylene radical.

The compounds of Formulae VIIIa, b and c thus prepared are reacted with an alkali metal aluminum hydride, using the same conditions as described above in the description of Methods B, C and D for the reaction of compounds of Formulae IVa, Va, VIa, and VIIa, b and c with an alkali metal aluminum hydride, thus producing the corresponding N-(1-, 2- and 3-indolyl-lower-alkyl)-N' - benzyl - N' - substituted - lower - alkylenediamines of Formulae IXa, b and c. It is preferred to use lithium aluminum hydride. It will be appreciated that Methods A, B, C and E can be adapted to the above-described synthesis as well and further that Methods B and C afford N - [ω - (3 - indolyl) - ω - hydroxy - lower - alkyl] - N'-benzyl-N'-substituted-lower-alkylenediamines corresponding to the compounds of Formulae IXa, b and c. That is, it is only necessary to substitute for the 1-substituted-piperazine and the 1-substituted-homopiperazine used in Methods A, B and E the corresponding N-benzyl-N-substituted-ethylenediamine and N-benzyl-N-substituted-propylenediamine, respectively, or to substitute for the 4-substituted-1-piperazinyl-lower-alkanoyl halide and the 4 - substituted - 1 - homopiperazinyl - lower - alkanoyl halide used in Method C the corresponding N-(N'-benzyl - N' - substituted - ethylenediamino) - lower - alkanoyl halide and N - (N' - benzyl - N' - substituted - propylenediamino)-lower-alkanoyl halide, respectively, and proceed as will be hereinafter described. It will also be appreciated that the latter step involving reaction of the intermediate amide with an alkali metal aluminum hydride can be omitted when using Methods A, C and E. It is only necessary to convert the amide produced in Methods B and D to the corresponding secondary amine before proceeding to the next step.

The N-(1-, 2- and 3-indolyl-lower-alkyl)-N'-benzyl-N'-substituted-lower-alkylenediamines corresponding to Formulae IXa, b, and c and the N-[ω-(3-indolyl)-ω-hydroxy-lower - alkyl] - N' - benzyl-N'-substituted-lower-alkylenediamines corresponding to Formula IXa, thus produced are then reacted with an α- or β-halo-lower-alkanoyl halide at a temperature between about 0° C. and 90° C. to give the benzohalide quaternary ammonium salts of the 1-[(1-, 2- and 3-indolyl)-lower-alkyl]-4-substituted-2-piperazinones, 1-[(1-, 2- and 3-indolyl)-lower-alkyl]-4-substituted-2-homopiperazinones, 1 - [ω-(3-indolyl)-ω-hydroxy-lower-alkyl]-4-substituted - 2 - piperazinones and 1-[ω-(3-indolyl)-ω-hydroxy-lower-alkyl] - 4 - substituted-2-homopiperazinones corresponding to Formulae Xa, b and c. The reaction can be carried out either with or without the use of an acid-acceptor and is preferably conducted in an organic solvent inert under the conditions of the reaction, for example, methylene dichloride, chloroform, ethylene dichloride, benzene and the like. For the purpose of illustration only, an α-halo-lower-alkanoyl halide is shown in the above-described reaction. However, an alternative procedure for preparing the benzohalide quaternary ammonium salts of the 1-[(1-, 2- and 3-indolyl)-lower-alkyl]-4-substituted-2-homopiperazinones and the 1-[ω-(3-indolyl) - ω - hydroxy-lower-alkyl]-4-substituted-2-homopiperazinones corresponding to Formulae Xa, b and c comprises reacting an N-(1-, 2- or 3-indolyl-lower-alkyl)-N'-benzyl - N' - substituted-ethylenediamine corresponding to Formulae IXa, b and c (m is 1) or an N-[ω-(3 - indolyl) - ω - hydroxy-lower-alkyl]-N'-benzyl-N'-substituted-ethylenediamine corresponding to Formula IXa (m is 1) with a β-halo-lower-alkanoyl halide using conditions similar to those described above when an α-halo-lower-alkanoyl halide is used. The α- or β-halo-lower-alkanoyl halides can be straight or branched and the β-halo-lower-alkanoyl halide can contain lower-alkyl radicals, $R_5$ or $R_6$, on either the α- or the β-carbon atom. Thus compounds of Formulae Xa, b and c can be obtained wherein $R_5$ and $R_6$ can occupy the 3-, 5- or 6-positions of the 2-piperazinone ring, or the 3-, 5-, 6-, or 7-positions of the 2-homopiperazinone ring or the 2-, 3-, 5- or 6-positions of the 7-homopiperazinone ring, and by proper choice of the N-benzyl-N-substituted-lower-alkylenediamine, or the α- or β-halo-lower-alkanoyl halide, compounds of the invention can be obtained where $R_5$ and/or $R_6$ represent such groups, inter alia, as methyl, ethyl, propyl or isopropyl.

The benzohalide quaternary ammonium salts of the 1-[(1-, 2- and 3 - indolyl)-lower-alkyl] - 4 - substituted-2-piperazinones, 1-[(1-, 2- and 3-indolyl)-lower-alkyl]-4-substituted-2- and 7-homopiperazinones, 1-[ω-(3-indolyl)-ω-hydroxy-lower-alkyl]-4-substituted-2-piperazinones and 1-[ω-(3 - indolyl)-ω-hydroxy-lower-alkyl]-4-substituted-2- and 7-homopiperazinones corresponding to Formulae Xa, b and c are then catalytically debenzylated to the corresponding free bases of Formulae XIa, b and c by reacting the former with hydrogen in the presence of a catalyst at a temperature from about 20° C. to about 70° C. and under hydrogen pressures in the range from about 30 p.s.i. to about 70 p.s.i. The reaction is conducted in an organic solvent inert under the conditions of the reaction, for example methanol, ethanol or 2-propanol. A preferred catalyst is palladium-on-charcoal and a preferred solvent is ethanol.

It will be appreciated that, when $R_2$ represents a benzyl, benzhydryl or cinnamyl radical in the compounds of Formulae X$a$, $b$ and $c$, this radical can also be removed by catalytic debenzylation to give compounds of Formulae XI$a$, $b$ and $c$ where $R_2$ is hydrogen. This synthetic method therefore provides a second process for preparing compounds of Formulae I$a$, $b$ and $c$ where $R_2$ is hydrogen.

The 1-[(1-, 2- and 3-indolyl)-lower-alkyl]-2-piperazinones, 1-[(1-, 2- and 3-indolyl)-lower-alkyl]-2- and 7-homopiperazinones, 1-[ω-(3-indolyl) - ω - hydroxy-lower-alkyl]-2-piperazinones and 1 - [ω-(3-indolyl)-ω-hydroxy-lower-alkyl]-2- and 7-homopiperazinones corresponding to Formulae XI$a$, $b$ and $c$ are then reacted with an alkali metal aluminum hydride, preferably lithium aluminum hydride, using conditions previously described, to give compounds of Formulae I$a$, $b$ and $c$ wherein $R_5$ and/or $R_6$ is either a hydrogen atom or a lower-alkyl radical.

Another synthetic procedure which provides access to compounds of Formulae I$a$, $b$ and $c$ wherein $R_5$ and/or $R_6$ is hydrogen or a lower-alkyl radical is illustrated below by the following reactions wherein $R_1$, $R_2$, $R_3$, $R_4$, $R_5$, $R_6$, $n$, $m$ and Hal have the meanings given above except that $R_2$ does not represent hydrogen:

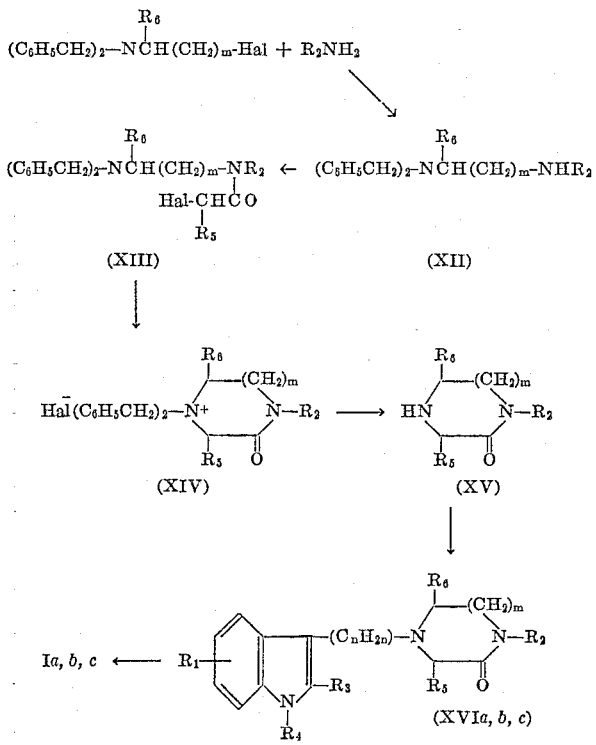

An N-(β- or γ-halo-lower alkyl)-N,N-dibenzylamine is reacted with a primary amine, $R_2NH_2$, at a temperature between about 50° C. and about 150° C. in the presence of an acid-acceptor. The reaction is preferably carried out in an organic solvent, inert under the conditions of the reaction, such as anhydrous ethanol, benzene, xylene, 2-ethoxyethanol (Cellosolve), and the like. The nature of the acid-acceptor is the same as that described above in the prepartion of 1-[(1-, 2- and 3-indolyl)-lower-alkyl]-4-substituted-piperazines and 1-[(1-, 2- and 3-indolyl)-lower-alkyl]-4-substituted-homopiperazines using Method A. The lower-alkyl radical, which is an ethylene radical when $m$ is 1 or a propylene radical when $m$ is 2, can be further substituted by a straight or branched lower-alkyl radical, $R_6$, and the lower-alkyl radical, $R_6$, can occupy any of the carbon atoms of the ethylene or propylene radical, although for the purpose of illustration only it is shown above on the carbon atom adjacent to the tertiary amino group. The compounds of Formula XII thus produced wherein $R_6$ is attached to the carbon atom adjacent to the tertiary amino group afford compounds of Formula I$a$, $b$ or $c$ wherein the lower-alkyl radical, $R_6$, is attached to the 2-position of the piperazine ring or the 7-position of the homopiperazine ring. Compounds of Formula I$a$, $b$ or $c$ wherein the lower-alkyl radical is attached to the 3-position of the piperazine ring or the 6-position of the homopiperazine ring are obtained from compounds of Formula XII where $R_6$ is attached to the β-carbon atom of the ethylene or propylene radical, respectively, and the compounds of Formula I$a$, $b$ or $c$ where the lower-alkyl radical, $R_6$, is attached to the 5-position of the homopiperazine ring are obtained from compounds of Formula XII where the lower-alkyl radical, $R_6$, is attached to the γ-carbon atom of the propylene radical (i.e. $m$ is 2). The homopiperazines can also be prepared by another method as will be hereinafter described.

The 1-(N,N-didenzylamino)-2- or 3-(N'-substituted)-lower-alkylene-secondary amines of Formula XII thus produced are reacted with an α- or β-halo-lower-alkanoyl halide using conditions similar to those described above in the description of the preparation of compounds of Formula X. The α- or β-halo-lower alkanoyl halide can be any α- or β-halo-lower alkanoyl halide of the type described above in the description of the preparation of compounds of Formulae X$a$, $b$ and $c$.

The resulting 1-(N,N-dibenzylamino)-2-[N'-(α- or β - halo - lower - alkanoyl) - N' - (substituted)] - lower-alkylenediamines of Formula XIII can be solated and purified or if desired quaternized in the crude form by refluxing in an appropriate organic solvent inert under the conditions of the reaction, for example ehtanol, acetonitrile or Cellosolve. A preferred solvent is Cellosolve.

For the purpose of illustration only, an α-halo-lower-alkanoyl halide is shown in the above-described reaction. However, by reacting a β-halo-lower-alkanoyl halide with ethylenediamine derivatives of Formula XII, the 1-benzyl-4-substituted-5-homopiperazinones corresponding to Formula XIV can be obtained. The α- or β-halo-lower-alkanoyl halides can be straight or branched and the β-halo-lower-alkanoyl halide can contain lower-alkyl radicals, $R_5$ or $R_6$, on either the α- or β-carbon atom. Thus, by proper choice of the α- or β-halo-lower-alkanoyl halide, compounds of Formula XIV afford, as will be seen, compounds of Formula I$a$, $b$ or $c$ where a lower-alkyl radical, $R_5$, is attached to the 2-position of the piperazine ring or to the 6- or 7-positions of the homopiperazine ring.

The 1-benzyl-4-substituted-3-piperazinone and 1-benzyl-4-substituted-5-homopiperazinone benzohalide quaternary ammonium salts of Formula XIV thus produced are catalytically debenzylated to the 1-substituted-2-piperazinones and 1-substituted-7-homopiperazinones of Formula XV using the same conditions as described above in the description of the preparation of compounds of Formulae XI$a$, $b$ and $c$. The 1-substituted-2-piperazinones and 1-substituted-7-homopiperazinones of Formula XV can be isolated and purified in the form of the free base or if desired can be converted to an acid-addition salt for purposes of purification and characterization. Appropriate acid-addition salts are those derived from mineral acids as hydrochloric acid, hydrobromic acid, hydriodic acid, nitric acid, sulfuric acid and phosphoric acid; and organic acids such as acetic acid, citric acid, lactic acid, tartaric acid and p-toluenesulfonic acid.

The 1-substituted-2-piperazinones and 1-substituted-7-homopiperazinones thus produced can then be reacted, for example, with a (1-, 2- or 3-indolyl)-lower-alkyl halide according to the procedure of Method A above the resulting 1-[(1-, 2- and 3-indolyl)-lower-alkyl]-4-substituted-3-piperazinone or 1-[(1-, 2- and 3-indolyl) - lower - alkyl] - 4 - substituted - 5 - homopiperazinone reacted with an alkali metal aluminum hydried to produce the 1-[(1-, 2- or 3-indolyl)-lower-alkyl]-4-substituted-piperazines or 1-[(1-, 2- or 3-indolyl)-lower-alkyl]-4-substituted-homopiperazines of Formulae I$a$, $b$ and $c$.

Method A was chosen above for purposes of illustration only but it is to be understood that Methods B, C. D and E can be adapted to the above-described synthesis as well. That is, it is only necessary to substitute for the 1-substituted-piperazine and the 1-substituted-homopiperazine used in Methods A, B, D and E or the 4-substituted-1-piperazinyl-lower-alkanoyl halide and 4-substituted-1-homopiperazinyl-lower-alkanoyl halide used in Method C the corresponding 1-substituted-2-piperazinones and 1-substituted-7-homopiperazinones or the 1-(4-substituted-3-piperazinonyl)-lower-alkanoyl halide and 1 - (4 - substituted - 5 - homopiperazinonyl) - lower-alkanoyl halide, respectively, and proceed as described above. Thus in addition to the 1-[(1-, 2- and 3-indolyl)-lower-alkyl]-4-substituted-3-piperazinones and 1-[(1-, 2- and 3-indolyl)-lower-alkyl]-4-substituted-5-homopiperazinones afforded by Method A, there can also be obtained 1-[(3-indolyl)glyoxalyl] - 4 - substituted - 3 - piperazinones and 1 - [(3 - indolyl)glyoxalyl]-4-substituted-5-homopiperazines by Method B, 1 - [ω - (3-indolyl)-ω-keto - lower - alkyl] - 4 - substituted - 3 - piperazinones and 1 - [ω - (3 - indolyl) - ω - keto - lower - alkyl] - 4 - substituted-5-homopiperazinones by Method C, 1-[1-, 2- or 3-indolyl)-α-keto-lower-alkyl]-4-substituted - 3 - piperazinones and 1-[(1-, 2- or 3-indolyl)-α-keto-lower-alkyl]-4-substituted-5-homopiperazinones by Method D and 1-[(3 - indolyl) - methyl] - 4 - substituted - 3 - piperazinones, 1-[(3-indolyl)methyl]-4-substituted-5-homopiperazinones by Method E. These on reaction with an alkali metal aluminum hydride afford, as the case may be, either the 1-[(1-, 2- and 3-indolyl)-lower-alkyl]-4-substituted-piperazines, 1-[(1-, 2- and 3-indolyl)-lower-alkyl]-4-substituted-homopiperazines, 1-[ω-(3-indolyl) - ω - hydroxy-lower-alkyl]-4-substituted-piperazines or the 1-[ω-(3-indolyl) - ω - hydroxy - lower - alkyl]-4-substituted-homopiperazines of Formulae I$a$, $b$ and $c$.

An alternative procedure for the preparation of the 1-substituted-7-homopiperazinones of Formula XV that are obtained when a β-halo-lower-alkanoyl halide is reacted with an ethylenediamine of Formula XII ($m$ is 1) comprises reacting a 1-substituted-4-piperidone with hydrazoic acid in the presence of a strong mineral acid, for example sulfuric acid, phosphoric acid or hydrochloric acid, and in an appropriate organic solvent inert under the conditions of the reaction, for example benzene, chloroform, trichloroethylene and the like. The hydrazoic acid can be in the form of a solution of hydrazoic acid in the solvent used or, if desired, in the form of an alkali metal salt, for example sodium azide. In the latter case, the alkali metal salt reacts with the mineral acid used to produce the hydrazoic acid in situ. The reaction is preferably carried out at a temperature in the range from about −10° C. to 25° C. Preferred solvents are benzene and chloroform and a preferred acid is sulfuric acid.

The method is particularly preferred for the preparation of 1-substituted-homopiperazinones corresponding to Formula XV where $R_5$ and $R_6$ are both hydrogen atoms. However, 1-substituted-homopiperazinones where $R_5$ and $R_6$ are both the same lower-alkyl radical are also prepared advantageously by this method from symmetrical 1-substituted-di-lower-alkyl-4-piperidones, such as 1-substituted-2,6-di-lower - alkyl-4-piperidones or 1-substituted-3,5,-di-lower-alkyl-4-piperidones, since the racemic mixture of 1-substituted-di-lower-alkyl - 5 - homopiperazinones produced in the reaction give, on reduction with an alkali metal aluminum hydride, a racemic mixture of the same 1-substituted-di-lower-alkyl-homopiperazine. On the other hand, when 1-substituted mono-lower-alkyl-4-piperidones or unsymmetrical 1-substituted-di-lower-alkyl-4-piperidones are employed, for example a 1-substituted-2,5-di-lower-alkyl-4-piperidone, the mixture of products, on reduction with an alkali metal aluminum hydride, give isomeric 1-substituted-homopiperazines and thus necessitate a separation of the isomers before proceeding to the next step.

The compounds of my invention are useful in the free base form or in the form of acid-addition or quaternary ammonium salts, and both forms are within the purview of the invention, and, in fact, are considered to be one and the same invention. The acid-addition and quaternary ammonium salts are simply a more convenient form for use, and in practice, use of the salt form inherently amounts to use of the base form. As used in the appended claims, unless specifically designated otherwise, the terms "1-[(1-, 2- or 3-indolyl)-lower-alkyl]piperazine" or "4-substituted-piperazine," "1-[(1-, 2- or 3-indolyl)-lower-alkyl]homopiperazine" or "4 - substituted-homopiperazine," "1-[ω-(3-indolyl) - ω - hydroxy-lower-alkyl]-piperazine" or "4-substituted-piperazine," or "1-[ω-(3-indolyl) - ω - hydroxy-lower-alkyl]homopiperazine" or "4-substituted-homopiperazine" means both the free base form and the acid-addition and lower-alkyl, lower-alkenyl and monocarbocyclic aryl-lower-alkyl quaternary ammonium salt form of the molecular structure recited. Pharmacologically acceptable salts are salts whose anions are innocuous to the animal organism in pharmacodynamic doses of the salts, so that beneficial physiological properties inherent in the free bases are not vitiated by side-effects ascribable to the anions; in other words, the latter do not substantially affect the pharmacological properties inherent in the cations. Appropriate acid-addition salts are those derived from mineral acids such as hydrochloric acid, hydrobromic acid, hydriodic acid, nitric acid, sulfuric acid and phosphoric acid; and organic acids such as acetic acid, citric acid, lactic acid, tartaric acid, methanesulfonic acid, benzenesulfonic acid, p-toluenesulfonic acid, sulfamic acid and quinic acid. The quaternary ammonium salts are obtained by the addition of esters having a molecular weight less than about 250 to the free base form of the compounds. A preferred class of esters comprises lower-alkyl, lower-alkenyl or monocarbocyclic aryl-lower-alkyl esters of inorganic acids or organic sulfonic acids having a molecular weight less than about 250. The lower-alkyl and lower-alkenyl esters can contain from one to about four carbon atoms, and the monocarbocyclic aryl-lower-alkyl esters can contain from seven to about ten carbon atoms. The esters include such compounds, inter alia, as methyl chloride, methyl bromide, methyl iodide, ethyl bromide, propyl chloride, 2-hydroxyethyl bromide, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, o-chlorobenzyl chloride, p-methoxybenzyl chloride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The quarternary ammonium salts are prepared by mixing the free base and the alkyl, alkenyl or monocarbocyclic aryl-lower-alkyl esters in an organic solvent inert under the conditions of reaction, for example, ethanol, methanol, ether, acetonitrile and the like. Heating can be used to facilitate the reaction, although salt formation usually takes place readily at room temperature. The quaternary ammonium salt separates directly or can be obtained by concentration of the solution.

Although therapeutically acceptable salts are preferred, those having toxic anions are also useful. All acid-addition salts are useful as intermediates in purification of the free bases, and toxic acid-addition and quaternary ammonium salts are useful as intermediates in preparing therapeutically acceptable salts by ion exchange procedures.

Pharmacological evaluation of the compounds of the invention has demonstrated that they possess a variety of depressant actions on the central and autonomic nervous system, the cardiovascular system and the skeletal-muscular system. They lower the blood pressure; they decrease the incidence of vomiting induced by apomorphine; they lower the rectal temperature; they potentiate the sleeping time induced by ether, thiopental sodium or hexobarbital sodium; and they produce tranquilization and skeletal muscle relaxation. These results indicate their usefulness as hypotensive agents, antinauseants, antipyretics, sedatives, tranquilizers and skeletal muscle relaxants. The compounds can be prepared for use by dissolving under sterile conditions a salt form of the compounds in water (or an equivalent amount of a nontoxic acid if the free base is used), or in a physiologically compatible aqueous medium such as saline, and stored in ampules for intramuscular injection. Alternatively, they can be incorporated in tablet or capsule form for oral administration. They are formulated and used in the same way as known compounds having similar activities, such as chlorpromazine. The toxicity of the compounds of the invention is of the same order of magnitude as that of chlorpromazine.

The structures of the compounds of the invention have been established by the mode of synthesis and corroborated by chemical analysis.

The following examples will further illustrate the invention without the latter being limited thereto.

PREPARATION OF INTERMEDIATES

Example 1

1-[2-(3-indolyl)ethyl]-4-methyl-2-piperazinone benzochloride [Xa; $R_1$, $R_3$, $R_4$, $R_5$ and $R_6$ are H, $R_2$ is $CH_3$, $C_nH_{2n}$ is $CH_2CH_2$, $m$ is 1, Hal$^-$ is Cl$^-$]: A solution of 11.5 g. (0.07 mole) of N-benzyl-N-methyl-aminoethylamine in 20 ml. of tetrahydrofuran was added over a five minute period with stirring to a solution of 14.6 g. (0.07 mole) of 3-indoleglyoxalyl chloride in 100 ml. of tetrahydrofuran. The mixture, which had become quite warm, was allowed to stand for about a half hour. About one liter of water and one equivalent of aqueous sodium hydroxide were added, and the product which separated was collected and recrystallized twice from ethanol giving 9.7 g. of N-benzyl-N'-(3-indolyl)glyoxalyl-N-methylethylenediamine, M.P. 124.5–127° C. (uncorr.) [Corresponds to VIIIa; $R_1$, $R_3$, $R_4$ and $R_6$ are H, $R_2$ is $CH_3$, $m$ is 1, and $C_{n-1}H_{2n-2}$ is C=O.]

Twenty-six grams (0.078 mole) of the N-benzyl-N'-(3-indolyl)glyoxalyl-N-methylethylenediamine dissolved in 125 ml. of tetrahydrofuran were added to a stirred suspension of 19 g. (0.05 mole) of lithium aluminum hydride in 250 ml. of tetrahydrofuran. The greenish mixture was refluxed and stirred for seven hours and then allowed to stand overnight at room temperature. A solution of 25 ml. of water and 75 ml. of tetrahydrofuran was added with stirring over a period of two and a half hours. An additional 30 ml. of water was added, the mixture was stirred for one hour, and 250 ml. of methylene dichloride was added and stirring continued for another half hour. The reaction mixture was filtered, the filter was washed with methylene dichloride, and the filtrate dried over magnesium sulfate and taken to dryness giving a light brown oil. The oil was crystallized from ethyl acetate giving 15.0 g. of N-benzyl-N'-[2-(3-indolyl)ethyl]-N-methylethylenediamine, M.P. 102–105° C. (uncorr.). [IXa; $R_1$, $R_3$, $R_4$, and $R_6$ are H, $R_2$ is $CH_3$, $n$ is 2, $m$ is 1].

A solution of 10.13 g. (0.033 mole) of the N-benzyl-N'-[2-(3-indolyl)ethyl]-N-methylethylenediamine, prepared above, in 60 ml. of methylene dichloride was stirred and cooled while adding a solution of 4.07 g. (0.036 mole) of α-chloroacetyl chloride in 15 ml. of methylene dichloride over a period of forty minutes. The mixture was allowed to stand at room temperature for an hour and a half, then refluxed for one hour and cooled. A little water and one equivalent of dilute sodium hydroxide were added, the mixture was stirred for fifteen minutes and then filtered giving a first crop of 3.6 g. of product, M.P. 229.5–232.5° C. (uncorr.). The methylene dichloride layer was separated from the filtrate and the aqueous layer extracted once with methylene dichloride. The combined organic extracts were dried and evaporated and the residue recrystallized once from methanol giving an additional 1.8 g. The combined samples gave 5.4 g. of 1-[2-(3-indolyl)ethyl]-4-methyl-2-piperazinone benzochloride, M.P. 226.6–228.6° C. (corr.).

*Analysis.*—Calcd. for $C_{22}H_{26}ClN_3O$: C, 68.82; H, 6.83; N, 10.95. Found: C, 68.70; H, 6.78; N, 10.93.

Example 2

1-[2-(3-indolyl)ethyl]-4-methyl-2-piperazinone [XIa; $R_1$, $R_3$, $R_4$, $R_5$ and $R_6$ are H, $R_2$ is $CH_3$, $C_nC_{2n}$ is $CH_2SH_2$, $m$ is 1]: By reducing the 1-[2-(3-indolyl)ethyl]-4-methyl-2-piperazinone benzochloride prepared above in Example 1 over 10% palladium-on-charcoal in an ethanol or Cellosolve solution and isolating the product from an alkaline medium, there can be obtained 1-[2-(3-indolyl)ethyl]-4-methyl-2-piperazinone.

Example 3

N-benzyl-N'-[2-(3-indolyl)ethyl] - N - phenylethylenediamine dihydrochloride [IXa; $R_1$, $R_3$, $R_4$, and $R_6$ are H, $R_2$ is $C_6H_5$, $n$ is 2, $m$ is 1], was prepared from 27 g. (0.13 mole) of 3-indolegyloxalyl chloride and 58 g. (0.26 mole) of N-benzyl-N-phenylaminoethylamine in 300 ml. of tetrahydrofuran according to the manipulative procedure described above in Example 1. There was thus obtained 41.9 g. of N-benzyl-N'-(3-indolyl)glyoxalyl-N-phenylethylenediamine, M.P. 162.2–162.8° C. (corr.).

*Analysis.*—Calcd. for $C_{15}H_{23}N_3O_2$: $N_T$, 10.57; $N_B$, 3.52. Found: $N_T$, 10.38, $N_B$, 3.61.

The above glyoxamide (103 g., 0.26 mole) was reduced with 76 g. (2.0 moles) of lithium aluminum hydride in 2.2 liters of tetrahydrofuran according to the manipulative procedure described above in Example 1. There was thus obtained 64 g. of N-benzyl-N'-[2-(3-indolyl)ethyl]-N-phenylethylenediamine dihydrochloride, M.P. 171.4–175.4 C. (corr.).

*Analysis.*—Calcd. for $C_{25}H_{27}N_3 \cdot 2HCl$: N, 9.50, Cl, 16.03. Found: N, 9.25; Cl, 16.12.

Example 4

1-[2-(3-indolyl)ethyl]-3-methyl-4-phenyl - 2 - piperazinone [XIa; $R_1$, $R_3$, $R_4$ and $R_6$ are H, $R_2$ is $C_6H_5$, $R_5$ is 3-$CH_3$, $C_nH_{2n}$ is $CH_2CH_2$, $m$ is 1]: By reacting the free base of the N-benzyl-N'-[2-(3-indolyl)ethyl]-N-phenylethylenediamine dihydrochloride prepared above in Example 3 with α-chloropropionyl chloride according to the mainpulative procedure described above in Example 1, there can be obtained 1-[2-(3-indolyl)ethyl]-3-methyl-4-phenyl-2-piperazinone benzochloride. On reduction of the latter with hydrogen over palladium-on-charcoal according to the mainpulative procedure described above in Example 2, there can be obtained 1-[2-(3-indolyl)ethyl]-3-methyl-4-phenyl-2-piperazinone.

Example 5

1-[2-(3-indolyl)ethyl]-4,6-dimethyl - 2 - piperazinone [XIa; $R_1$, $R_3$, $R_4$, and $R_5$ are H, $R_2$ is $CH_3$, $R_6$ is 6-$CH_3$, $C_nH_{2n}$ is $CH_2CH_2$, $m$ is 1]: By following the manipulative procedure described above in Examples 1 and 2 and by replacing the N-benzyl-N-methyl-aminoethylamine used therein with a molar equivalent amount of 1-(N-benzyl-N-methylamino)-2-propylamine, there can be obtained 1-[2-(3-indolyl)ethyl]-4,6-dimethyl-2-piperazinone.

Example 6

1-[2-(3-indolyl)ethyl]-3-isopropyl-4-methyl-2-piperazinone [XIa; $R_1$, $R_3$, $R_4$ and $R_6$ are H, $R_2$ is $CH_3$, $R_5$ is 3-$CH(CH_3)_2$, $C_nH_{2n}$ is $CH_2CH_2$, $m$ is 1]: By following the manipulative procedure described above in Examples 1 and 2 and by replacing the α-chlorocacetyl chloride used therein with a molar equivalent amount of α-chloroisovaleryl chloride, there can be obtained 1-[2-(3-indolyl)ethyl]-3-isopropyl-4-methyl-2-piperazinone.

Example 7

1-[2-(3-indolyl)ethyl]-2,5-dimethyl-7-homopiperazinone [XIa; $R_1$, $R_3$, $R_4$ and $R_5$ are H, $R_2$ is $CH_3$, $R_6$ is 2-$CH_3$, $C_nH_{2n}$ is $CH_2CH_2$, $m$ is 2]: By following the manipulative procedures described above in Examples 1 and 2, and by replacing the N-benzyl-N-methylaminoethylamine used therein with a molar equivalent amount of 1-(N-benzyl-N-methylamino)-3-butylamine, there can be obtained 1-[2-(3-indolyl)ethyl]-2,5-dimethyl-7-homopiperazinone.

Example 8

1-[2-(3-indolyl)ethyl]-2,5,6-trimethyl-7-homopiperazinone [XIa; $R_1$, $R_3$ and $R_4$ are H, $R_2$ is $CH_3$, $R_5$ is 6-$CH_3$, $R_6$ is 2-$CH_3$, $C_nH_{2n}$ is $CH_2CH_2$, $m$ is 2]: By following the manipulative procedure described above in Examples 1 and 2, and by replacing the N-benzyl-N-methylaminoethylamine and the α-chloroacetyl chloride used therein with molar equivalent amounts of 1-(N-benzyl-N-methylamino)-3-butylamine and α-chloropropionyl chloride, respectively, there can be obtained 1-[2-(3-indolyl)ethyl]-2,5,6-trimethyl-7-homopiperazinone.

Example 9

1-phenyl-2-piperazinone [XV; $R_2$ is $C_6H_5$, $R_5$ nd $R_6$ are H, $m$ is 1]: To a solution of 177 g. (0.5 mole) of 1-(N,N-dibenzylamino)-2-(N'-phenyl)ethylamine in 650 ml. of chloroform was added 80 ml. (120 g., 1.0 mole) of α-chloroacetyl chloride. The resulting red solution was refluxed for five and a half hours. The solvent and the bulk of the excess acid chloride were removed in vacuo and the residue dissolved in chloroform once again and extracted with dilute sodium hydroxide. The organic extracts were dried and the solvent removed leaving 190 g. of crude 1-(N,N-dibenzylamino)-2-(N'-α-chloroacetyl-N'-phenyl)ethylamine. The oil was taken into hot cellosolve and the solution refluxed for four hours. The cooled solution was diluted to a volume of 650 ml. with absolute ethanol. The resulting solution of 1-benzyl-4-phenyl-3-piperazinone benzochloride was divided into two portions and each reduced over 2 g. of 10% palladium-on-charcoal under 50 p.s.i. of hydrogen. Reduction in each case was essentially complete in about six hours. The solutions were combined and treated with excess alcoholic hydrochloric acid and diluted strongly with ether. The resulting solid which separated was collected and dried giving 91 g. of crude 1-phenyl-2-piperazinone hydrochloride. The hydrochloride salt was converted to the free base by treatment with alkali and the crude base sublimed at reduced pressure and recrystallized from ethyl acetate giving 1-phenyl-2-piperazinone, M.P. 100–105° C. (uncorr.).

*Analysis.*—Calcd. for $C_{10}H_{12}N_2O$: C, 68.15; H, 6.87; N, 15.90. Found: C, 68.27; H, 7.07; N, 15.77.

A small amount of the base was converted to the p-toluenesulfonic acid salt giving 1-phenyl-2-piperazinone p-toluenesulfonate, M.P. 220.2–224.6° C. (corr.).

*Analysis.*—Calcd. for $C_{10}H_{12}N_2O \cdot C_7H_8O_3S$: N, 8.04; S, 9.20. Found: N, 8.01; S, 9.07.

1-phenyl-2-piperazinone can be reacted with hydrobromic acid, hydriodic acid, nitric acid, sulfuric acid, phosphoric acid, acetic acid, citric acid, lactic acid, tartaric acid or p-toluenesulfonic acid to give the hydrobromide, hydriodide, nitrate, sulfate (or bisulfate), phosphate (or acid phosphate), acetate, citrate (or acid citrate), lactate, tartrate (or bitartrate or p-toluenesulfonate salts, respectively.

Example 10

1-(4-chlorophenyl)-2-piperazinone hydrochloride [XV; $R_2$ is 4-$ClC_6H_4$, $R_5$ and $R_6$ are H, $m$ is 1], was prepared from 38.7 g. (0.1 mole) of N-(4-chlorophenyl)-N',N'-dibenzylethylenediamine and 22.5 g. (0.2 mole) of α-chloroacetyl chloride in chloroform according to the manipulative procedure described above in Example 9. There was thus obtained the intermediate 1-(N,N-dibenzylamino)-2-[N'-(α-chloroacetyl-N'-(4-chlorophenyl)]ethylamine hydrochloride, M.P. 161.0–163.8° C. (corr.).

*Analysis.*—Calcd. for $C_{24}H_{24}Cl_2N_2O \cdot HCl$: N, 6.04; Cl, 22.93. Found: N, 5.94; Cl, 22.90.

The latter was converted to the free base, quaternized in boiling Cellosolve and the resulting quaternary salt debenzylated over a palladium-on-charcoal catalyst according to the manipulative procedure described above in Example 9. There was thus obtained 1-(4-chlorophenyl)-2-piperazinone hydrochloride, M.P. 192.8–194.8° C. (corr.).

*Analysis.*—Calcd. for $C_{10}H_{11}ClN_2O \cdot HCl$: C, 48.60; H, 4.90; N, 11.34. Found: C, 48.37; H, 5.10; N, 11.05.

Example 11

1-(2,6-dimethylphenyl)-2-piperazinone hydrochloride [XV; $R_2$ is 2,6-$(CH_3)_2C_6H_3$, $R_5$ and $R_6$ are H, $m$ is 1], was prepared from 68.8 g. (0.2 mole) of 1-(N,N-dibenzylamino)-2-[N'-(2,6-dimethylphenyl]ethylamine and 45 g. (0.4 mole) of α-chloroacetyl chloride in 300 ml. of chloroform according to the manipulative procedure described above in Example 9. Catalytic debenzylation of the quaternary ammonium salt was interrupted after the uptake of one mole of hydrogen, and there was thus obtained the intermediate 4-benzyl-1-(2,6-dimethylphenyl)-2-piperazinone hydrochloride, M.P. 248.8–264.8° C. (corr.).

*Analysis.*—Calcd. for $C_{19}H_{22}N_2O \cdot HCl$: Cl, 10.72; N, 8.47. Found: Cl, 10.58; N, 8.50.

On continued reduction of the above 4-benzyl-1-(2,6-dimethylphenyl)-2-piperazinone hydrochloride over palladium-on-charcoal, there was obtained 1-(2,6-dimethylphenyl)-2-piperazinone hydrochloride, M.P. 224.8–226.0° C. (corr.).

*Analysis.*—Calcd. for $C_{12}H_{16}N_2O \cdot HCl$: Cl, 14.73; N, 11.64. Found: Cl, 14.66; N, 11.54.

Example 12

1-phenyl-6-methyl-2-piperazinone [XV; $R_2$ is $C_6H_5$, $R_5$ is H, $R_6$ is 6-$CH_3$, $m$ is 1]: By following the manipulative procedure described above in Example 9 and by replacing the 1-(N,N-dibenzylamino)-2-(N'-phenyl)ethylamine used therein with a molar equivalent amount of 1-(N,N-dibenzylamino)-2-(N'-phenyl)propylamine, there can be obtained 1-phenyl-6-methyl-2-piperazinone.

Example 13

1-phenyl-3-isopropyl-2-piperazinone [XV; $R_2$ is $C_6H_5$, $R_5$ is 3-$CH(CH_3)_2$, $R_6$ is H, $m$ is 1]: By following the manipulative procedure described above in Example 9 and by replacing the α-chloroacetyl chloride used therein with a molar equivalent amount of α-chloroisovaleryl chloride, there can be obtained 1-phenyl-3-isopropyl-2-piperazinone.

Example 14

1-phenyl-3-methyl-7-homopiperazinone [XV; $R_2$ is $C_6H_5$, $R_5$ is H, $R_6$ is 3-$CH_3$, $m$ is 2]: By following the manipulative procedure described above in Example 9 and by replacing the 1-(N,N-dibenzylamino)-2-(N'-phenyl)ethylamine used therein with a molar equivalent amount of 2-(N,N-dibenzylamino)-4-(N'-phenyl)butylamine, there can be obtained 1-phenyl-3-methyl-7-homopiperazinone.

Example 15

1-phenyl-3,6-dimethyl-7-homopiperazinone [XV; $R_2$ is $C_6H_5$, $R_5$ is 6-$CH_3$, $R_6$ is 3-$CH_3$, $m$ is 2]: By following the manipulative procedure described above in Example 9 and by replacement of the 1-(N,N-dibenzylamino)-2-(N'-phenyl)ethylamine and the α-chloroacetyl chloride used therein by molar equivalent amounts of 2-(N,N-dibenzylamino)-4-(N'-phenyl)butylamine and α-chloropropionyl chloride, respectively, there can be obtained 1-phenyl-3,6-dimethyl-7-homopiperazinone.

Example 16

1 - [2 - (3 - indolyl)ethyl] - 4 - phenyl - 3 - piperazinone [XVIa; $R_1$, $R_3$, $R_4$, $R_5$ and $R_6$ are H, $R_2$ is $C_6H_5$, $C_nH_{2n}$ is $CH_2CH_2$, $m$ is 1]: A solution of 3.52 g. (0.02 mole) of the 1-phenyl-2-piperazinone prepared above in Example 9, 5.0 g. (0.02 mole) of 2-(3-indolyl)ethyl bromide and 2.8 g. (0.02 mole) of anhydrous potassium carbonate in 30 ml. of acetonitrile was refluxed for five hours, then cooled, diluted with water and basified with dilute sodium hydroxide. The mixture was extracted with chloroform and the extracts dried and evaporated. The residual brown gummy material was recrystallized twice from methanol giving 2.4 g. of 1-[2-(3-indolyl)ethyl]-4-phenyl-3-piperazinone, M.P. 163.2–164.4° C. (corr).

Analysis.—Calcd. for $C_{20}H_{21}N_3O$: C, 75.21; H, 6.63; N, 13.16. Found: C, 75.32; H, 6.56; N, 13.06.

Examples 17–22

By following the manipulative procedure described above in Example 16 and by replacing the 1-phenyl-2-piperazinone used therein with a molar equivalent amount of the 2-piperazinones corresponding to Formula XV prepared above in Examples 10–15, there can be obtained the respective compounds corresponding to Formula XVIa listed below in Table 1 where $R_1$, $R_3$ and $R_4$ in each is H and $C_nH_{2n}$ in each is $CH_2CH_2$.

TABLE 1 (FORMULA XVIa)

| Example | $R_2$ | $R_5$ | $R_6$ | $m$ |
|---|---|---|---|---|
| 17 | 4-$ClC_6H_4$ | H | H | 1 |
| 18 | 2,6-$(CH_3)_2C_6H_3$ | H | H | 1 |
| 19 | $C_6H_5$ | H | 6-$CH_3$ | 1 |
| 20 | $C_6H_5$ | 3-$CH(CH_3)_2$ | H | 1 |
| 21 | $C_6H_5$ | H | 3-$CH_3$ | 2 |
| 22 | $C_6H_5$ | 6-$CH_3$ | 3-$CH_3$ | 2 |

Example 23

1 - [(3 - indolyl)glyoxalyl] - 4 - (2 - methylphenyl)piperazine [IVa; $R_1$, $R_3$, $R_4$, $R_5$ and $R_6$ are H, $R_2$ is 2-$CH_3C_6H_4$, $m$ is 1]: A cold, stirred solution of 79.2 g. (0.45 mole) of 1-(2-methylphenyl)-piperazine in 500 ml. of tetrahydrofuran was treated all at once with 31.2 g. (0.15 mole) of (3-indolyl)glyoxalyl chloride. There was an immediate voluminous precipitate of a white crystalline solid which was removed by filtration. The filtrate was taken to dryness and the residual light brown gum was stirred and shaken with about 700 ml. of water, 120 ml. of ethyl acetate and about 25 ml. of acetic acid. The mixture was warmed on a steam bath and the resulting solid was collected after cooling in an ice bath thus affording 41.5 g. (80%) of 1-[(3-indolyl)glyoxalyl]-4-(2-methylphenyl) piperazine as a near white solid.

Examples 24–91

By following the manipulative procedure described above in Example 23, substituting for the reactants used therein an appropriate (3-indolyl)glyoxalyl chloride and 1-substituted piperazine, there were obtained the compounds of Formula IVa listed below in Table 2 where $R_5$ and $R_6$ in each is H and $m$ in each is 1. The melting points are uncorrected unless noted otherwise and in the columns headed "Analysis," the symbols $N_T$ and $N_B$ represent total nitrogen and basic nitrogen, respectively.

TABLE 2 (FORMULA IVa)

| Ex. | $R_1/R_2$ | $R_3/R_4$ | M.P., °C. | Analysis Calcd. | Analysis Found |
|---|---|---|---|---|---|
| 24 | H / $CH_3$ | H | | | |
| 25 | H / $CH_2CH_2OH$ | H | | | |
| 26 | H / 3-$CH_3C_6H_4$ | H | | | |
| 27 | H / 2-$CH_3OC_6H_4$ | H | | | |
| 28 | H / 4-$CH_3OC_6H_4$ | H | 243–5 | | |
| 29 | H / 3-Cl-4-$CH_3C_6H_3$ | H | 211–4 | | |
| 30 | 6-$CH_3O$ / $C_6H_5$ | H | 205–9 | | |
| 31 | 6-$CH_3O$ / 2-$CH_3C_6H_4$ | H | 247–50 | | |
| 32 | 6-$CH_3O$ / 3-$CH_3C_6H_4$ | H | 206–8 | | |
| 33 | 6-$CH_3O$ / 4-$CH_3C_6H_4$ | H | 196–8 | | |
| 34 | 6-$CH_3O$ / 2-$CH_3OC_6H_4$ | H | 246–8 | | |
| 35 | 6-$CH_3O$ / 4-$CH_3OC_6H_4$ | H | 205–10 | | |
| 36 | 5-$C_6H_5CH_2O$ / 4-$CH_3C_6H_4$ | H | 148–55 | | |
| 37 | 5-$C_6H_5CH_2O$ / $C_6H_5CH_2CH_2$ | H | 135–40 | | |
| 38 | 5-$CH_3S$ / $C_6H_5$ | H | 188–91 | C, 66.46; H, 5.58 | C, 66.80; H, 5.66 |
| 39 | 5-$CH_3S$ / 4-$CH_3C_6H_4$ | H | 211–3 | C, 67.16; H, 5.89 | C, 67.41; H, 5.43 |
| 40 | 5,6-$OCH_2O$ / $C_6H_5$ | H | 267–9 | | |
| 41 | 5,6-$OCH_2O$ / 2-$CH_3C_6H_4$ | H | 214.6–5.8 | $N_T$, 10.79; $N_B$, 3.58 | $N_T$, 10.79; $N_B$, 3.59 |
| 42 | 5,6-$OCH_2O$ / 3-$CH_3C_6H_4$ | H | 212–6 | | |
| 43 | 5,6-$OCH_2O$ / 4-$CH_3C_6H_4$ | H | 266.4–78.4 | $N_T$, 10.74; $N_B$, 3.58 | $N_T$, 10.59; $N_B$, 3.59 |
| 44 | 5,6-$OCH_2O$ / 2-$CH_3OC_6H_4$ | H | 205–9 | | |
| 45 | 5,6-di-$CH_3O$ / $C_6H_5$ | H | 256.8–8.8 | $N_T$, 10.68; $N_B$, 3.56 | $N_T$, 10.62; $N_B$, 3.45 |
| 46 | 5,6-di-$CH_3O$ / 2-$CH_3C_6H_4$ | H | 211–6 | | |
| 47 | 5,6-di-$CH_3O$ / 3-$CH_3C_6H_4$ | H | 231–8 | | |
| 48 | 5,6-di-$CH_3O$ / 4-$CH_3C_6H_4$ | H | | | |
| 49 | 5,6-di-$CH_3O$ / 2-$CH_3OC_6H_4$ | H | 218–22 | | |
| 50 | 5,6-di-$CH_3O$ / 3-$CH_3OC_6H_4$ | H | 234.4–6.4 | $N_T$, 9.92; $N_B$, 3.31 | $N_T$, 9.86; $N_B$, 3.22 |
| 51 | 5,6-di-$CH_3O$ / 4-$CH_3OC_6H_4$ | H | 228–36 | | |
| 52 | 5,6-di-$CH_3O$ / 4-$CH_3SC_6H_4$ | H | 236.4–8.2 | N, 9.56; S, 7.29 | N, 9.43; S, 7.19 |
| 53 | 5,6-di-$C_2H_5O$ / $C_6H_5$ | H | 180.0–1.0 | $N_T$, 9.97; $N_B$, 3.32 | $N_T$, 9.65; $N_B$, 3.24 |
| 54 | H / $C_6H_5$ | $CH_3$ | | | |
| 55 | 5,6-di-$CH_3O$ / $C_6H_5$ | $CH_3$ | 163–74 | | |
| 56 | 5,6-$OCH_2O$ / 4-$CH_3OC_6H_4$ | $CH_3$ | 173–266 | | |
| 57 | 5,6-$OCH_2O$ / $C_6H_5$ | $CH_3$ | 219.0–.8 | $N_T$, 10.95; $N_B$, 3.59 | $N_T$, 10.74; $N_B$, 3.58 |
| 58 | 5,6-di-$CH_3O$ / $C_6H_5$ | $CH_3$ | 215–22 | | |
| 59 | H / $C_6H_5$ | $CH_3$ | | | |
| 60 | H / 2-$C_5H_4N$ | H | 242–3 | | |
| 61 | 4-$CH_3O$ / $C_6H_5$ | H | | | |
| 62 | 5-$CH_3O$ / $C_6H_5$ | H | 224–7.5 | | |
| 63 | 7-$CH_3O$ / $C_6H_5$ | H | | | |
| 64 | 6-$CH_3$ / $C_6H_5$ | H | | | |
| 65 | 6-$C_2H_5O$ / $C_6H_5$ | H | 165 (dec.) | | |
| 66 | 6-$CH_3O$ / $C_6H_5$ | $CH_3$ | 218–20 | N, 11.13 | N, 10.86 |
| 67 | 6-$CH_3O$ / $C_6H_5$ | $C_6H_5$ | 155–60 | | |
| 68 | 6-$CH_3O$ / 2-$ClC_6H_4$ | H | 125.2–8.8 | C, 63.39; H, 5.07; N, 10.54 | C, 63.10; H, 4.77; N, 10.50 |
| 69 | 6-$CH_3O$ / 3-$ClC_6H_4$ | H | 214–16 | Cl, 8.89 | Cl, 9.54 |
| 70 | 6-$CH_3O$ / 3-$CH_3OC_6H_4$ | H | 211–13 | N, 10.49 | N, 10.14 |
| 71 | 6-$CH_3O$ / 2-$C_2H_5OC_6H_4$ | H | 180–4 | | |
| 72 | 6-$CH_3O$ / 2,6-$(CH_3)_2C_6H_3$ | H | 215–8 | | |

TABLE 2 (FORMULA IVa)—Continued

| Ex. | $R_1/R_2$ | $R_3/R_4$ | M.P., °C. | Analysis Calcd. | Analysis Found |
|---|---|---|---|---|---|
| 73 | 6-CH$_3$O / 2-CH$_3$O-5-ClC$_6$H$_3$ | H / H | 208–11 | N, 9.82 | N, 9.75. |
| 74 | 5,6-di-CH$_3$O / C$_6$H$_5$CH$_2$ | H / H | ¹210.2–11.8 | N$_T$, 10.31 / N$_B$, 3.44 | N$_T$, 10.07 / N$_B$, 3.37. |
| 75 | 5-C$_2$H$_5$O-6-CH$_3$O / C$_6$H$_5$ | H / H | 215–22 | | |
| 76 | 5,6-di-CH$_3$O / 2-C$_5$H$_4$N | H / H | ¹249.6–51.6 | C, 63.94 / H, 5.62 / N$_T$, 14.21 | C, 64.11 / H, 5.39 / N$_T$, 13.98. |
| 77 | 5,6-OCH$_2$CH$_2$O / C$_6$H$_5$ | H / H | 172.5–8.5 | N$_T$, 11.56 | N$_T$, 11.31. |
| 78 | 5,6-di-CH$_3$O / 2-CH$_3$OC$_6$H$_4$ | CH$_3$ / H | ¹211.4–2.6 | N$_T$, 9.61 / N$_B$, 3.20 | N$_T$, 9.71 / N$_B$, 3.13. |
| 79 | 5,6-di-CH$_3$O / 2-C$_2$H$_5$OC$_6$H$_4$ | H / H | 135–43 | | |
| 80 | 5,6-di-CH$_3$O / 2-CH$_3$OC$_6$H$_4$ | CH$_3$ / H | 119–22 | N$_T$, 10.68 | N$_T$, 10.82. |
| 81 | 5,6-di-CH$_3$O / 3-CH$_3$OC$_6$H$_4$ | CH$_3$ / H | 120–2 | | |
| 82 | 5,6-di-CH$_3$O / 3-CH$_3$OC$_6$H$_4$ | CH$_3$ / H | 159.63–5 | | |
| 83 | 5,6-di-CH$_3$O / 2,6-(CH$_3$)$_2$C$_6$H$_3$ | H / H | ¹253.2–6.2 | N$_T$, 9.97 / N$_B$, 3.32 | N$_T$, 9.96 / N$_B$, 3.50. |
| 84 | 5,6-OCH$_2$O / 2-CH$_3$OC$_6$H$_4$ | CH$_3$ / H | 233–5 | | |
| 85 | 5,6-OCH$_2$O / 4-CH$_3$OC$_6$H$_4$ | H / H | 257–8 | | |
| 86 | 5,6-OCH$_2$O / 2-n-C$_4$H$_9$OC$_6$H$_4$ | H / H | 164–7.5 | | |
| 87 | 5,6-di-C$_2$H$_5$O / 2-CH$_3$OC$_6$H$_4$ | H / H | 185–6.5 | | |
| 88 | 5,6-di-C$_2$H$_5$O / 3-CH$_3$OC$_6$H$_4$ | H / H | 162–165.5 | | |
| 89 | H / C$_6$H$_5$ | H / H | ¹224.2–5.6 | N$_T$, 12.61 / N$_B$, 4.20 | N$_T$, 12.54 / N$_B$, 4.13. |
| 90 | H / C$_6$H$_5$CH$_2$ | H / H | ¹174.4–75.6 | N$_T$, 12.10 / N$_B$, 4.03 | N$_T$, 12.11 / N$_B$, 4.01. |
| 91 | 5,6-di-CH$_3$O / 2-ClC$_6$H$_4$ | H / H | ¹214.0 Indef. | N$_T$, 9.82 / N$_B$, 3.27 | N$_T$, 9.81 / N$_B$, 3.34. |

¹ Corrected.

*Examples 92–104*

By following the manipulative procedure described above in Example 23 and by substituting for the reactants used therein an appropriate (3-indolyl)glyoxalyl chloride and 1-substituted piperazine, there can be obtained the compounds of Formula IVa listed below in Table 3 where $R_3$, $R_5$ and $R_6$ in each is H and $m$ in each is 1:

TABLE 3 (FORMULA IVa)

| Ex. | $R_1$ | $R_2$ | $R_4$ |
|---|---|---|---|
| 92 | 5-F | CH(CH$_3$)$_2$ | CH(CH$_3$)$_2$ |
| 93 | 5-Cl | CH$_2$CH(CH$_3$)$_2$ | CH$_2$CH(CH$_3$)$_2$ |
| 94 | 5-Br | (CH$_2$)$_5$CH$_3$ | (CH$_2$)$_5$CH$_3$ |
| 95 | 5-I | CH$_2$CH$_2$OH | C$_6$H$_5$CH$_2$ |
| 96 | 6-CH$_3$S | CH(CH$_3$)CH$_2$CH$_2$OH | 4-ClC$_6$H$_4$CH$_2$ |
| 97 | 6-(CH$_3$)$_2$CHS | (CH$_2$)$_6$H | 4-FC$_6$H$_4$CH$_2$ |
| 98 | 6-CF$_3$ | C$_6$H$_5$CH$_2$ | 4-BrC$_6$H$_4$CH$_2$ |
| 99 | 6-CH$_3$O | 4-CH$_3$C$_6$H$_4$CH$_2$ | 4-IC$_6$H$_4$CH$_2$ |
| 100 | 6-CH$_3$O | 4-(CH$_3$)$_2$CHCH$_2$C$_6$H$_4$CH$_2$ | C$_6$H$_5$CH$_2$CH$_2$ |
| 101 | 5,6-di-CH$_3$O | 2-pyrimidyl | H |
| 102 | H | 2-pyrazinyl | H |
| 103 | H | 2-thiazolyl | CH$_3$ |
| 104 | H | 2-(1,3,5-triazinyl) | H |

*Example 105*

1 - [3 - (5-chloro-3-indolyl)-3-keto-1-propyl]-4-benzhydrylpiperazine [Va; $R_1$ is 5-Cl, $R_2$ is (C$_6$H$_5$)$_2$CH, $R_3$, $R_5$ and $R_6$ are H, $C_{n-1}H_{2n-2}$ is CH$_2$CH$_2$, $m$ is 1]: By reaction of 1-benzhydryl piperazine with acrylonitrile in the presence of a basic catalyst, for example Triton B, in an appropriate organic solvent, for example ethanol, there can be obtained β-(4-benzhydryl-1-piperazinyl)propionitrile. On hydrolysis of the latter in boiling aqueous sulfuric acid and isolating the product from a neutral medium, there can be obtained β-(4-benzhydryl-1-piperazinyl)propionic acid, which on reaction with thionyl chloride gives β-(4-benzhydryl-1-piperazinyl) propionyl chloride. On addition of the latter to a cold ether or tetrahydrofuran solution of 5-chloroindolyl magnesium bromide (prepared by reaction of 5-chloroindole with an ether solution of, for example, ethyl magnesium bromide), there can be obtained 1-[3-(5-chloro-3-indolyl)-3-keto-1-propyl]-4-benzhydrylpiperazine.

*Example 106*

1 - [3 - (5-chloro-1-methyl-3-indolyl)-3-keto-1-propyl]-4-benzhydrylpiperazine [VIa; $R_1$ is 5-Cl, $R_2$ is (C$_6$H$_5$)$_2$CH, $R_3$, $R_5$ and $R_6$ are H, $R_4$ is CH$_3$, $C_{n-1}H_{2n-2}$ is CH$_2$CH$_2$, $m$ is 1]: By adding the 1-[3-(5-chloro-3-indolyl) - 3-keto-1-propyl]-4-benzhydrylpiperazine prepared above in Example 105 to a solution containing one molar equivalent of sodamide in liquid ammonia (prepared by dissolving one atom equivalent of sodium in liquid ammonia) and treating the resulting solution with one molar equivalent of a methyl halide, for example methyl iodide, there can be obtained 1-[3-(5-chloro - 1 - methyl-3-indolyl)-3-keto-1-propyl]-4-benzhydrylpiperazine.

*Example 107*

1-[4-(1-benzyl-2-phenyl-3-indolyl)-4-keto - 1 - butyl]-4-phenyl piperazine [VIa; $R_1$ is H, $R_2$ and $R_3$ are C$_6$H$_5$, $R_4$ is C$_6$H$_5$CH$_2$, $R_5$ and $R_6$ are H, $C_{n-1}H_{2n-2}$ is (CH$_2$)$_3$]: By reacting 1-phenylpiperazine with acrylonitrile in the presence of a basic catalyst, for example Triton B, in an appropriate organic solvent, for example ethanol, there can be obtained β-(4-phenyl-1-piperazinyl)propionitrile. On refluxing the latter in anhydrous methanol saturated with hydrogen chloride, there can be obtained methyl β-(4-phenyl-1-piperazinyl)propionate. The latter on reduction with lithium aluminum hydride gives 3-(4-phenyl-1-piperazinyl)-1-propanol which on reaction with phosphorous tribromide gives 3-(4-phenyl-1-piperazinyl)-1-bromopropane. By reacting the latter with magnesium turnings in anhydrous ether, carbonating the resulting solution of the Grignard reagent and isolating the product from a neutral medium, there can be obtained γ-(4-phenyl-1-piperazinyl)butyric acid. Treatment of the butyric acid with thionyl chloride gives γ-(4-phenyl-1-piperazinyl)butyryl chloride. Reaction of the latter with 2-phenylindolyl magnesium bromide prepared according to the manipulative procedure described above in Example 105 gives 1 - [4 - (2 - phenyl-3-indolyl)-4-keto-1-butyl]-4-phenylpiperazine. By reacting the latter with benzyl chloride in the presence of sodamide according to the manipulative procedure described above in Example 106, there can be obtained 1-[4-(1-benzyl-2-phenyl-3-indolyl)-4-keto-1-butyl]-4-phenylpiperazine.

*Examples 108–112*

By following the manipulative procedures described above in Examples 105 and 106 substituting for the reactants used in Example 105 a 4-methyl-1-piperazinyl-butyryl halide and an appropriate indolyl magnesium halide and substituting for the methyl halide used in Example 106 an appropriate lower-alkyl halide, monocarbocyclic aryl-lower-alkyl halide or monocarbocyclic aryl-lower-alkenyl halide, there can be obtained the compounds of Formula VIa listed below in Table 4 where $R_2$ in each is CH$_3$, $R_3$, $R_5$ and $R_6$ in each are H, $C_{n-1}H_{2n-2}$ in each is (CH$_2$)$_3$ and $m$ in each is 1:

TABLE 4 (FORMULA VIa)

| Example | $R_1$ | $R_4$ |
|---|---|---|
| 108 | 6-n-C$_4$H$_9$O | 4-CH$_3$SC$_6$H$_4$CH$_2$CH$_2$ |
| 109 | 5,6,7-tri-CH$_3$O | 4-n-C$_4$H$_9$OC$_6$H$_4$CH$_2$CH$_2$ |
| 110 | H | 3-HOC$_6$H$_4$CH$_2$CH$_2$ |
| 111 | H | C$_6$H$_5$CH=CHCH$_2$ |
| 112 | 3,4,5-(CH$_3$O)$_3$C$_6$H$_2$CH$_2$O | CH$_3$ |

*Example 113*

1-[2-(3-indolyl) - 1 - ketoethyl] - 4 - phenylpiperazine [VIIa; $R_1$, $R_3$, $R_4$, $R_5$ and $R_6$ are H, $R_2$ is C$_6$H$_5$, $n$ is 2, $m$ is 1]: To a cold, stirred solution of 22.5 g. (0.132 mole) of indole-3-acetic acid and 13.3 g. (0.132 mole) of triethylamine in 800 ml. of acetone was added 18.1 g.

(0.132 mole) of isobutyl chloroformate and the solution was stirred at −10° C. for twenty minutes. A solution of 21.4 g. (0.132 mole) of 1-phenylpiperazine in a little acetone was added, and the solution stirred for an hour and forty-five minutes at room temperature. The insoluble material was removed by filtration, the filtrate taken to dryness, and the residue redissolved in methylene dichloride and washed with water and dilute sodium hydroxide. The organic layer was dried, the solvent removed and the residue recrystallized from ethanol giving 5.4 g. of 1-[2-(3-indolyl)-1-ketoethyl]-4-phenylpiperazine, M.P. 179.4–181.6° C. (corr.).

Analysis.—Calcd. for $C_{20}H_{21}N_3O$: $N_T$, 13.16; $N_B$, 4.39. Found: $N_T$, 12.91; $N_B$, 4.39.

Example 114

1-[3-(3-indolyl)-1-ketopropyl] - 4 - phenylpiperazine [VIIa; $R_1$, $R_3$, $R_4$, $R_5$ and $R_6$ are H, $R_2$ is $C_6H_5$, $C_{n-1}H_{2n-2}$ is $CH_2CH_2$, $m$ is 1], was prepared from 25 g. (0.132 mole) of indole-3-propionic acid, 13.3 g. (0.132 mole) of triethylamine, 18.1 g. (0.132 mole) of isobutyl chloroformate and 21.4 g. (0.132 mole) of 1-phenylpiperazine in 800 ml. of acetone according to the manipulative procedure described above in Example 113. The product was recrystallized from ethanol giving 27.5 g. of 1 - [3 - (3-indolyl)-1-ketopropyl]-4-phenylpiperazine, M.P. 136.2–137.4° C. (corr.).

Analysis.—Calcd. for $C_{21}H_{23}N_3O$: $N_T$, 12.42; $N_B$, 4.14. Found: $N_T$, 12.52; $N_B$, 4.18.

Example 115

1-[3-(1-indolyl)-1-ketopropyl] - 4 - phenylpiperazine [VIIc; $R_1$, $R_3$, $R_5$ and $R_6$ are H, $R_2$ is $C_6H_5$, $C_{n-1}H_{2n-2}$ is $CH_2CH_2$, $m$ is 1], was prepared from 25 g. (0.132 mole) of indole-1-propionic acid, 13.3 g. (0.132 mole) of triethylamine, 18.1 g. (0.132 mole) of isobutyl chloroformate and 21.4 g. (0.132 mole) of 1-phenylpiperazine in 800 ml. of acetone according to the manipulative procedure described above in Example 113. There was thus obtained 37 g. of 1-[3-(1-indolyl-1-ketopropyl]-4-phenylpiperazine as a light brown oil.

Examples 116–126

By following the manipulative procedure described above in Example 113, substituting for the reactants used therein an appropriate 3-indole-lower-alkanoic acid and 1-substituted-piperazine, there were obtained the compounds of Formula VIIa listed below in Table 5 in which $R_3$, $R_4$, $R_5$ and $R_6$ in each are hydrogen and $m$ in each is 1. The melting points are uncorrected unless noted otherwise.

Example 127

1-(2-indolylcarbonyl)-4-phenylpiperazine [VIIb; $R_1$, $R_4$, $R_5$ and $R_6$ are H, $R_2$ is $C_6H_5$, $n$ is 1, $m$ is 1]: By following the manipulative procedure described above in Example 113, replacing the indole-3-acetic acid used therein with a molar equivalent amount of indole-2-carboxylic acid, there can be obtained 1-(2-indolylcarbonyl)-4-phenylpiperazine.

Example 128

1-(3-indolylcarbonyl)-4-phenylpiperazine [VIIa; $R_1$, $R_3$, $R_4$, $R_5$ and $R_6$ are H, $R_2$ is $C_6H_5$, $n$ is 1, $m$ is 1]: By following the manipulative procedure described above in Example 113, replacing the indole-3-acetic acid used therein with a molar equivalent amount of indole-3-carboxylic acid, there can be obtained 1-(3-indolylcarbonyl)-4-phenylpiperazine.

Examples 129–137

By following the manipulative procedure described above in Example 113 substituting for the indolyl-3-acetic acid and the 1-phenylpiperazine used therein, a molar equivalent amount of an appropriate substituted indole-3-acetic acid and an appropriate 1-substituted-piperazine or 1-substituted-homopiperazine, respectively, there can be obtained the 1-[2-(3-indolyl)-1-ketoethyl]-4-substituted-piperazines and -4-substituted-homopiperazines of Formula VIIa listed below in Table 6 where $R_3$, $R_4$, $R_5$ and $R_6$ in each is H and $n$ in each is 2:

TABLE 6 (FORMULA VIIa)

| Example | $R_1$ | $R_2$ | $m$ |
|---|---|---|---|
| 129 | 4-$C_2H_5$ | $C_6H_5CH_2CH_2$ | 1 |
| 130 | 5-$(CH_3)_2CH$ | 4-$CH_3SC_6H_4CH_2CH_2$ | 1 |
| 131 | 6-$CH_3(CH_2)_4$ | 4-$(CH_3)_2CHSC_6H_4CH_2CH_2$ | 2 |
| 132 | 7-$(CH_3)_3C$ | 3, 4-$OOCH_2O$—$CC_6H_3CH_2CH_2$ | 2 |
| 133 | H | 2-$C_5H_4N$ | 1 |
| 134 | H | 2-pyrimidyl | 2 |
| 135 | 5,6-di-$CH_3O$ | 2-pyrazinyl | 2 |
| 136 | 5,6-$OCH_2O$ | 2-thiazolyl | 1 |
| 137 | 5,6-$OCH_2CH_2O$ | 2-(1,3,5-triazinyl) | 1 |

PREPARATION OF FINAL PRODUCTS

Example 138

1-[2-(3-indolyl)ethyl]-4-phenylpiperazine [Ia; $R_1$, $R_3$, $R_4$, $R_5$, $R_6$ and X are H, $R_2$ is $C_6H_5$, $n$ is 2, $m$ is 1]: A mixture of 5.6 g. (0.025 mole) of 3-indolylethyl bromide, 4.1 g. (0.025 mole) of 1-phenylpiperazine and 2.1 g. (0.025 mole) of sodium bicarbonate in 30 ml. of absolute ethanol was refluxed with stirring for six hours. The bulk of the solvent was removed in vacuo, water was added along with sufficient dilute sodium hydroxide to render the mixture alkaline, and the mixture was extracted with ether. The organic extracts were dried, the solvent removed and the residue recrystallized from acetone to give 1.4 g. of 1-[2-(3-indolyl)ethyl]-4-phenylpiperazine, M.P. 131.6–136.0° C. (corr.).

TABLE 5 (FORMULA VIIa)

| Example | $R_1$ | $R_2$ | $C_{n-1}H_{2n-2}$ | M.P., ° C. | Analysis Calcd. | Analysis Found |
|---|---|---|---|---|---|---|
| 116 | H | 3-$CH_3OC_6H_4$ | $CH_2$ | | | |
| 117 | H | 2-$ClC_6H_4$ | $CH_2CH_2$ | | | |
| 118 | H | 2-$CH_3C_6H_4$ | $CH_2CH_2$ | | | |
| 119 | H | 2-$CH_3OC_6H_4$ | $CH_2CH_2$ | ¹173.0–7.0 | $N_T$, 11.56; $N_B$, 3.85 | $N_T$, 11.63; $N_B$, 3.89 |
| 120 | H | $C_6H_5$ | $(CH_2)_3$ | | | |
| 121 | H | 2-$CH_3OC_6H_4$ | $(CH_2)_3$ | 129–32 | | |
| 122 | H | 3-$CH_3OC_6H_4$ | $(CH_2)_3$ | | | |
| 123 | 6-$CH_3O$ | $C_6H_5$ | $CH_2CH_2$ | 169–72 | $N_T$, 11.56 | $N_T$, 11.04 |
| 124 | 6-$CH_3O$ | 2-$CH_3OC_6H_4$ | $CH_2CH_2$ | 120.5–2.0 | C, 70.20; H, 6.92; N, 10.68 | C, 69.00; H, 6.77; N, 10.30 |
| 125 | 5,6-di-$CH_3O$ | 3-$ClC_6H_4$ | $CH_2$ | | | |
| 126 | 5,6-$OCH_2O$ | $C_6H_5$ | $CH_2CH_2$ | 178–80 | | |

¹ Corrected.

*Analysis.*—Calcd. for $C_{20}H_{23}N_3$: C, 78.65; H, 7.59; N, 13.76. Found: C, 78.74; H, 7.74; N, 13.59.

Examples 139–142

By following the manipulative procedure described above in Example 138 substituting for the reactants used therein an appropriate (3-indolyl)-lower-alkyl bromide and 1-substituted-piperazine, there were obtained the (3-indolyl)-lower-alkyl-4-substituted piperazines of Formula Ia listed below in Table 7, where $R_3$, $R_4$, $R_5$, $R_6$ and X in each is H, $n$ in each is 2 and $m$ in each is 1. All melting points are corrected.

TABLE 7 (FORMULA Ia)

| Example | $R_1$ | $R_2$ | M.P., °C. | Analysis Calcd. | Found |
|---|---|---|---|---|---|
| 139 | H | 4-ClC$_6$H$_4$ | 185.2–186.8 | C, 70.68; H, 6.52; N, 12.37 | C, 70.80; H, 6.51; N, 12.23 |
| 141 | H | 4-CH$_3$C$_6$H$_4$ | 147.8–154.8 | C, 78.96; H, 7.89; N, 13.15 | C, 78.62; H, 7.61; N, 12.91 |
| 141 | 5-CH$_3$O | 4-CH$_3$C$_6$H$_4$ | 108.6–111.0 | C, 75.61; H, 7.79; N, 12.03 | C, 75.91; H, 7.88; N, 11.93 |
| 142 | H | C$_6$H$_5$CH=CHCH$_2$ | 258.2–263.6 | C, 66.02; H, 6.99; N, 10.02 | C, 65.57; H, 7.01; N, 9.98 |

Examples 143–147

By following the manipulative procedure described above in Example 138, replacing the 3-indolylethyl bromide used therein with a molar equivalent amount of a (1-indolyl)-lower-alkyl halide and the 1-phenylpiperazine used therein with a molar equivalent amount of an appropriate 1-substituted-piperazine or 1-substituted-homopiperazine, there can be obtained the compounds of Formula Ic listed below in Table 8 where $R_1$, $R_5$ and $R_6$ in each is H.

TABLE 8 (FORMULA Ic)

| Example | $R_2$ | $R_3$ | $C_nH_{2n}$ | $m$ |
|---|---|---|---|---|
| 143 | 4-ClC$_6$H$_4$ | H | CH$_2$CH$_2$ | 1 |
| 144 | 2-C$_5$H$_4$N | CH$_3$ | CH$_2$CH(CH$_3$) | 1 |
| 145 | 2-pyrimidyl | C$_2$H$_5$ | (CH$_2$)$_3$ | 2 |
| 146 | 2-pyrazinyl | C$_6$H$_5$ | (CH$_2$)$_4$ | 2 |
| 147 | 2-thiazolyl | H | (CH$_2$)$_3$ | 1 |

Examples 148–152

By following the manipulative procedure described above in Example 138, replacing the 3-indolylethyl bromide used therein with a molar equivalent amount of a (2-indolyl)-lower-alkyl halide and the 1-phenylpiperazine used therein with a molar equivalent amount of an appropriate 1-substituted-piperazine or 1-substituted-homopiperazine, there can be obtained the compounds of Formula Ib listed below in Table 9 where $R_1$, $R_5$ and $R_6$ in each is H.

TABLE 9 (FORMULA Ib)

| Example | $R_2$ | $R_4$ | $C_nH_{2n}$ | $m$ |
|---|---|---|---|---|
| 148 | 4-ClC$_6$H$_4$ | H | CH$_2$ | 1 |
| 149 | 2-C$_5$H$_4$N | CH$_3$ | CH$_2$CH$_2$ | 2 |
| 150 | 2-pyrimidyl | C$_6$H$_5$CH$_2$ | (CH$_2$)$_3$ | 2 |
| 151 | 2-pyrazinyl | C$_6$H$_5$ | (CH$_2$)$_3$ | 1 |
| 152 | 2-thiazolyl | C$_6$H$_5$CH=CHCH$_2$ | (CH$_2$)$_3$ | 2 |

Examples 153–158

By following the manipulative procedure described above in Example 138 substituting for the reactants used therein an appropriate (3-indolyl)-lower-alkyl halide and 1-methylpiperazine, there can be obtained the 1-[(3-indolyl)-lower-alkyl]-4-methylpiperazines of Formula Ia listed below in Table 10 where $R_1$, $R_4$, $R_5$, $R_6$ and X in each is H, $R_2$ in each is CH$_3$ and $m$ in each is 1.

TABLE 10 (FORMULA Ia)

| Example | $R_3$ | $C_{n-1}H_{2n-2}$ |
|---|---|---|
| 153 | CH$_3$ | (CH$_2$)$_2$ |
| 154 | CH(CH$_3$)$_2$ | (CH$_2$)$_3$ |
| 155 | CH$_2$CH(CH$_3$)$_2$ | (CH$_2$)$_4$ |
| 156 | (CH$_2$)$_5$CH$_3$ | (CH$_2$)$_5$ |
| 157 | C$_6$H$_5$ | (CH$_2$)$_6$ |
| 158 | 4-CH$_3$SC$_6$H$_4$ | CH(C$_2$H$_5$)CH$_2$ |

Example 159

1 - [2-(3-indolyl)ethyl]-4-(2-methylphenyl)piperazine [Ia; $R_1$, $R_3$, $R_4$, $R_5$, $R_6$ and X are H, $R_2$ is 2-CH$_3$C$_6$H$_4$, $n$ is 2, $m$ is 1]: A solution of 41.5 g. (0.12 mole) of 1-[(3-indolyl)-glyoxalyl]-4-(2-methylphenyl)piperazine in 250 ml. of tetrahydrofuran was added over a ten minute period to a stirred suspension of 27 g. (0.72 mole) of lithium aluminum hydride in 300 ml. of tetrahydrofuran. The mixture was refluxed and stirred for six and a half hours and the excess lithium aluminum hydride then destroyed by the dropwise addition of 140 ml. of 10% sodium hydroxide solution. The mixture was filtered, the insoluble material was washed with boiling chloroform, and the filtrate dried over anhydrous sodium sulfate and concentrated to dryness. The residual light orange oil was crystallized from a benzene-hexane mixture giving 28.5 g. of 1-[2-(3-indolyl)ethyl]-4-(2-methylphenyl)piperazine, M.P. 124.2–126.4° C.

*Analysis.*—Calcd. for $C_{21}H_{25}N_3$: C, 78.96; H, 7.89; N, 13.16. Found: C, 79.05; H, 7.85; N, 13.10.

1 - [2-(3-indolyl)ethyl]-4-(2-methylphenyl)piperazine can be reacted with hydrochloric acid, hydrobromic acid, hydriodic acid, sulfuric acid, phosphoric acid, acetic acid, citric acid, tartaric acid, quinic acid, methyl iodide, methyl bromide, ethyl bromide, allyl bromide, benzyl chloride, 2-chlorobenzyl chloride or methyl p-toluenesulfonate to give the hydrochloride, hydrobromide, hydriodide, sulfate (or bisulfate), phosphate (or acid phosphate), acetate, citrate (or acid citrate), tartrate (or bitartrate), quinate, methiodide, methobromide, ethobromide, allobromide, benzochloride, 2-chlorobenzochloride, or metho-p-toluenesulfonate salts, respectively.

1 - [2-(3-indolyl)ethyl]-4-(2-methylphenyl)piperazine can be reacted with arsenic acid to give the arsenate salt which can be useful as a characterizing derivative.

1 - [2-(3-indolyl)ethyl]-4-(2-methylphenyl)piperazine, in the form of its hydrofluoride salt can be converted to the hydrochloride salt by passing an aqueous solution of the former over an ion-exchange resin saturated with chloride ions, for example Rohm and Haas' Amberlite® IRA–400 resin.

Examples 160–224

By following the manipulative procedure described above in Example 159, substituting for the 1-[(3-indolyl)glyoxalyl]-4-(2-methylphenyl)piperazine used therein the 1-[(3-indolyl)glyoxalyl] - 4 - substituted-piperazines prepared above in Examples 24–88 (Table 2), the respective 1-[2-(3-indolyl)ethyl]-4-substituted-piperazines of Formula Ia listed below in Table 11 were prepared. All melting points are corrected unless noted otherwise. In each example $R_5$ and $R_6$ are H, $n$ is 2 and $m$ is 1.

TABLE 11 (FORMULA Ia)

| Example | R₁/R₂ | R₃/R₄ | X | Salt | M.P., °C. | Analysis Calcd. | Analysis Found |
|---|---|---|---|---|---|---|---|
| 160 | H / CH₃ | H / H | H | 2HCl | 279.0–83.8 | N, 13.29; Cl, 22.42 | N, 12.99; Cl, 22.20 |
| 161 | H / CH₂CH₂OH | H / H | H | 2HCl | 266.8–71.4 | N, 12.13; Cl, 20.48 | N, 11.78; Cl, 20.50 |
| 162 | H / 3-CH₃C₆H₄ | H / H | H | | 163.8–6.2 | C, 78.96; H, 7.89; N, 13.15 | C, 79.20; H, 7.59; N, 12.94 |
| 163 | H / 2-CH₃OC₆H₄ | H / H | H | | 111.4–4.2 | C, 75.19; H, 7.51; N_B, 8.28 | C, 75.20; H, 7.45; N_B, 8.24 |
| 164 | H / 4-CH₃OC₆H₄ | H / H | H | | 129.8–31.6 | C, 75.19; H, 7.51; N, 12.53 | C, 75.34; H, 7.80; N, 12.51 |
| 165 | H / 3-Cl-4-CH₃C₆H₃ | H / H | H | | 159.2–60.6 | N, 11.88; Cl, 10.02 | N, 11.62; Cl, 10.32 |
| 166 | 6-CH₃O / C₆H₅ | H / H | H | | 137.4–9.6 | C, 75.19; H, 7.51; N, 12.53 | C, 74.93; H, 7.42; N, 12.61 |
| 167 | 6-CH₃O / 2-CH₃C₆H₄ | H / H | H | | 139.2–41.4 | C, 75.61; H, 7.79; N, 12.03 | C, 75.34; H, 7.90; N, 11.75 |
| 168 | 6-CH₃O / 3-CH₃C₆H₄ | H / H | H | | 119.8–23.4 | C, 75.61; H, 7.79; N, 12.03 | C, 75.84; H, 7.80; N, 11.83 |
| 169 | 6-CH₃O / 4-CH₃C₆H₄ | H / H | H | | 172.2–3.4 | C, 75.69; H, 7.88; N, 12.45 | C, 75.61; H, 7.79; N, 12.03 |
| 170 | 6-CH₃O / 2-CH₃OC₆H₄ | H / H | H | | 98.2–100.2 | N_T, 11.50; N_B, 7.67 | N_T, 11.31; N_B, 7.43 |
| 171 | 6-CH₃O / 4-CH₃OC₆H₄ | H / H | H | | 185.6–8.6 | N_T, 11.50; N_B, 7.67 | N_T, 11.09; N_B, 7.53 |
| 172 | 5-C₆H₅CH₂O / 4-CH₃C₆H₄ | H / H | H | | 151.4–3.6 | C, 79.02; H, 7.34; N, 9.88 | C, 79.20; H, 7.15; N, 9.79 |
| 173 | 5-C₆H₅CH₂O / C₆H₅CH₂CH₂ | H / H | H | | ¹ 121–3 | | |
| 174 | 5-CH₃S / C₆H₅ | H / H | H | | 110.2–1.6 | N, 11.95; S, 9.12 | N, 11.82; S, 9.20 |
| 175 | 5-CH₃S / 4-CH₃C₆H₄ | H / H | H | | 111.0–3.6 | N, 11.50; S, 8.77 | N, 11.39; S, 8.90 |
| 176 | 5,6-OCH₂O / C₆H₅ | H / H | H | | 141.0–3.2 | C, 72.18; H, 6.63; N, 12.03 | C, 72.54; H, 6.89; N, 11.77 |
| 177 | 5,6-OCH₂O / 2-CH₃C₆H₄ | H / H | H | | 159.2–60.8 | C, 72.81; H, 6.93; N, 11.60 | C, 72.92; H, 6.97; N, 11.44 |
| 178 | 5,6-OCH₂O / 3-CH₃C₆H₄ | H / H | H | | 130.0–1.4 | N_T 11.58; N_B, 7.72 | N_T 11.46; N_B, 7.42 |
| 179 | 5,6-OCH₂O / 4-CH₃C₆H₄ | H / H | H | | 187.0–8.8 | N_T 11.58; N_B, 7.72 | N_T 11.37; N_B, 7.56 |
| 180 | 5,6-OCH₂O / 2-CH₃OC₆H₄ | H / H | H | | 158.0–9.4 | N_T, 11.08; N_B, 7.39 | N_T, 10.90; B_B, 7.13 |
| 181 | 5,6-di-CH₃O / C₆H₅ | H / H | H | | 128.4–30.0 | N_T, 11.50; N_B, 7.67 | N_T, 11.35; N_B, 7.47 |
| 182 | 5,6-di-CH₃O / 2-CH₃C₆H₄ | H / H | H | HCl | 218.4–23.4 | Cl, 8.52; N, 10.10 | Cl, 8.33; N, 9.81 |
| 183 | 5,6-di-CH₃O / 3-CH₃C₆H₄ | H / H | H | | 118.4–9.6 | N_T, 11.07; N_B, 7.38 | N_T, 10.80; N_B, 7.18 |
| 184 | 5,6-di-CH₃O / 4-CH₃C₆H₄ | H / H | H | | 137.8–9.2 | C, 72.79; H, 7.70; N, 11.07 | C, 72.69; H, 7.79; N, 11.15 |
| 185 | 5,6-di-CH₃O / 2-CH₃OC₆H₄ | H / H | H | | 116.0–.6 | N_T, 10.63; N_B, 7.09 | N_T, 10.43; N_B, 6.86 |
| 186 | 5,6-di-CH₃O / 3-CH₃OC₆H₄ | H / H | H | | 123.0–4.0 | N_T, 10.63; N_B, 7.09 | N_T, 10.54; N_B, 6.96 |
| 187 | 5,6-di-CH₃O / 4-CH₃OC₆H₄ | H / H | H | | 158.8–64.0 | N_T, 10.63; N_B, 7.09 | N_T, 10.37; N_B, 6.94 |
| 188 | 5,6-di-CH₃O / 4-CH₃SC₆H₄ | H / H | H | | 175.4–7.2 | N, 10.21; S, 7.79 | N, 9.89; S, 7.97 |
| 189 | 5,6-di-C₂H₅O / C₆H₅ | H / H | H | | 123.0–5.2 | N_T, 10.68; N_B, 7.12 | N_T, 10.37; N_B, 6.83 |
| 190 | H / C₆H₅ | CH₃ / H | H | | 154.2–5.6 | C, 78.96; H, 7.89; N, 13.15 | C, 78.78; H, 7.69; N, 13.08 |
| 191 | 5,6-di-CH₃O / C₆H₅ | CH₃ / H | H | HCl | 249.0–55.4 | Cl, 8.52; N, 10.10 | Cl, 8.75; N, 9.97 |
| 192 | 5,6-OCH₂O / 4-CH₃OC₆H₄ | CH₃ / H | H | | 160.8–2.8 | N_T, 10.68; N_B, 7.12 | N_T, 10.42; N_B, 7.08 |
| 193 | 5,6-OCH₂O / C₆H₅ | H / CH₃ | OH | | ¹ 171–2.5 | N, 11.08; O, 12.65 | N, 11.08; O, 12.48 |
| 194 | 5,6-di-CH₃O / C₆H₅ | H / CH₃ | OH | | 128.4–30.2 | N_T, 10.63; N_B, 7.09 | N_T, 10.60; N_B, 7.35 |
| 195 | H / C₆H₅ | H / CH₃ | OH | | 136.8–9.6 | N_T, 12.03; N_B, 8.02 | N_T 11.84; N_B, 7.95 |
| 196 | H / 2-C₅H₄N | H / H | H | HCl | 232.2–4.4 | N_T, 16.34; Cl, 10.34 | N_T, 16.59; Cl, 10.44 |
| 197 | 4-CH₃O / C₆H₅ | H / H | H | | 177.2–82.2 | N_T, 12.53; N_B, 4.18 | N_T, 12.53; N_B, 3.93 |
| 198 | 5-CH₃O / C₆H₅ | H / H | H | | 147.4–50.0 | N_T, 12.53; N_B, 8.35 | N_T, 12.18; N_B, 8.07 |
| 199 | 7-CH₃O / C₆H₅ | H / H | H | | 122.0–5.2 | N_T, 12.53; N_B, 4.18 | N_T, 12.38; N_B, 4.09 |
| 200 | 6-CH₃ / C₆H₅ | H / H | H | | 174.2–5.2 | N_T, 13.16; N_B, 4.39 | N_T, 12.91; N_B, 4.23 |
| 201 | 6-C₂H₅O / C₆H₅ | H / H | H | | 159.6–63.2 | N_T, 12.03; N_B, 4.01 | N_T, 12.12; N_B, 4.00 |
| 202 | 6-CH₃O / C₆H₅ | CH₃ / H | H | HCl | 253.2–6.2 | N, 10.89; Cl, 9.19 | N, 10.77; Cl, 9.20 |
| 203 | 6-CH₃O / C₆H₅ | C₆H₅ / H | H | | 148.2–8.8 | N_T, 10.21; N_B, 3.40 | N_T, 10.41; N_B, 3.46 |
| 204 | 6-CH₃O / 2-ClC₆H₄ | H / H | H | | 125.2–8.8 | N_T, 11.36; N_B, 3.78 | N_T, 11.36; N_B, 3.82 |

TABLE 11 (FORMULA Ia)—Continued

| Example | R₁/R₂ | R₃/R₄ | X | Salt | M.P., °C. | Analysis Calcd. | Analysis Found |
|---|---|---|---|---|---|---|---|
| 205 | 6-CH₃O / 3-ClC₆H₄ | H / H | }H | | 103.6–4.4 | N_T, 11.36 / Cl, 9.58 | N_T, 11.45. / Cl, 9.64. |
| 206 | 6-CH₃O / 3-CH₃OC₆H₄ | H / H | }H | | 142.0–4.6 | C, 72.30 / H, 7.45 / N, 11.50 | C, 72.16. / H, 7.39. / N, 11.00. |
| 207 | 6-CH₃O / 2-C₂H₅OC₆H₄ | H / H | }H | | 159.4–61.4 | N_T, 11.07 / N_B, 7.38 | N_T, 11.30. / N_B, 7.31. |
| 208 | 6-CH₃O / 2,6-(CH₃)₂C₆H₃ | H / H | }H | | 135.2–6.8 | C, 75.99 / H, 8.04 / N, 11.56 | C, 76.10. / H, 8.21. / N, 11.54. |
| 209 | 6-CH₃O / 2-CH₃O-5-ClC₆H₃ | H / H | }H | | 121.8–8.6 | N, 10.51 / Cl, 8.86 | N, 10.41. / Cl, 8.55. |
| 210 | 5,6-di-CH₃O / C₆H₅CH₂ | H / H | }H | | 113.0–4.4 | N_T, 11.07 / N_B, 7.38 | N_T, 10.97. / N_B, 7.28. |
| 211 | 5-C₂H₅O-6-CH₃O / C₆H₅ | H / H | }H | | 129.2–30.6 | N_T, 11.07 / N_B, 7.38 | N_T, 10.76. / N_B, 7.17. |
| 212 | 5,6-di-CH₃O / C₅H₄N | H / H | }H | HCl | 210.2–11.8 | N, 13.91 / Cl, 8.80 | N, 13.84. / Cl, 8.95. |
| 213 | 5,6-OCH₂CH₂O / C₆H₅ | H / H | }H | | 170.8–6.8 | N_T, 11.56 / N_B, 7.70 | N_T, 11.31. / N_B, 7.55. |
| 214 | 5,6-di-CH₃O / 2-CH₃OC₆H₄ | CH₃ / H | }H | 2HCl | 217.4–20.8 | C, 59.75 / H, 6.89 / Cl, 14.70 | C, 59.87. / H, 6.59. / Cl, 14.44. |
| 215 | 5,6-di-CH₃O / 2-C₂H₅OC₆H₄ | H / H | }H | | 120.4–2.0 | C, 70.39 / H, 7.63 / N_B, 6.84 | C, 70.34. / H, 7.48. / N_B, 6.67. |
| 216 | 5,6-di-CH₃O / 2-CH₃C₆H₄ | CH₃ / H | }H | | 119.8–21.6 | N_T, 10.68 / N_B, 7.12 | N_T, 10.82. / N_B, 7.28. |
| 217 | 5,6-di-CH₃O / 3-CH₃C₆H₄ | CH₃ / H | }H | 2HCl | 210.2–3.8 | C, 61.80 / H, 7.13 / Cl, 15.20 | C, 61.55. / H, 7.22. / Cl, 15.40. |
| 218 | 5,6-di-CH₃O / 3-CH₃OC₆H₄ | CH₃ / H | }H | 2HCl | 182.6–4.2 | N_T, 8.71 / Cl, 14.70 | N_T, 8.76. / Cl, 14.65. |
| 219 | 5,6-di-CH₃O / 2,6-(CH₃)₂C₆H₃ | H / H | }H | | 117.8–9.6 | C, 73.25 / H, 7.94 / N_B, 10.68 | C, 73.32. / H, 7.77. / N_B, 10.77. |
| 220 | 5,6-OCH₂O / 2-CH₃OC₆H₄ | CH₃ / H | }H | | 137.0–43.0 | N_T, 10.68 / N_B, 7.12 | N_T, 10.76. / N_B, 7.02. |
| 221 | 5,6-OCH₂O / 4-CH₃OC₆H₄ | H / H | }H | | 182.4–4.6 | N_T, 11.08 / N_B, 7.38 | N_T, 11.04. / N_B, 7.28. |
| 222 | 5,6-OCH₂O / 2-n-C₄H₉OC₆H₄ | H / H | }H | | 125–6.4 | N_T, 9.97 / N_B, 6.65 | N_T, 9.99. / N_B, 6.38. |
| 223 | 5,6-di-C₂H₅O / 2-CH₃OC₆H₄ | H / H | }H | | 89.4–92.0 | N_T, 9.92 / N_B, 6.61 | N_T, 9.83. / N_B, 6.42. |
| 224 | 5,6-di-C₂H₅O / 3-CH₃OC₆H₄ | H / H | }H | | 97.6–8.4 | N_T, 9.92 / N_B, 6.61 | N_T, 10.10. / N_B, 6.59. |

¹ Uncorrected.

Example 225

1-[2-(5,6-dimethoxy-3-indolyl)-2-hydroxyethyl]-4-(4-methylphenyl)-piperazine [Ia; $R_1$ is 5,6-di-CH₃O, $R_2$ is 4-CH₃C₆H₄, $R_3$, $R_4$, $R_5$ and $R_6$ are H, X is OH, $n$ is 2, $m$ is 1], was isolated as a by-product in the preparation of 1-[2-(5,6-dimethoxy-3-indolyl)ethyl]-4-(4-methylphenyl)piperazine (Example 184) from 33 g. (0.081 mole) of 1-[(5,6-dimethoxy-3-indolyl)glyoxalyl]-4-(4-methylphenyl)piperazine and 10 g. (0.263 mole) of lithium aluminum hydride in 1100 ml. of tetrahydrofuran according to the manipulative procedure described above in Example 159. The crude product isolated from the reaction mixture was recrystallized from methanol to give a first crop of 20 g. which on recrystallization from ethyl acetate gave 16.2 g. of 1-[2-(5,6-dimethoxy-3-indolyl)ethyl]-4-(4-methylphenyl)piperazine, M.P. 134–137° C. (uncorr.) (Example 184).

Analysis.—Calcd. for C₂₃H₂₉N₃O₂: N, 11.07. Found: N, 10.87.

The filtrate from the main crop on concentration afforded a second crop of 2.5 g. of crystals, M.P. 190–196° C. (uncorr.). It was recrystallized from acetone to give 2 g. of 1-[2-(5,6-dimethoxy-3-indolyl)-2-hydroxyethyl]-4-(4-methylphenyl)piperazine, M.P. 193.2–198.0° C. (corr.).

Analysis.—Calcd. for C₂₃H₂₉N₃O₃: C, 69.85; H, 7.39; N, 10.63; O, 12.14. Found: C, 70.04; H, 7.16; N, 10.55; O, 12.08.

Example 226

1-[2-(5-hydroxy-3-indolyl)ethyl]-4-(4-methylphenyl)piperazine [Ia; $R_1$ is 5-HO, $R_2$ is 4-CH₃C₆H₄, $R_3$, $R_4$, $R_5$, $R_6$ and X are H, $n$ is 2, $m$ is 1]: The 1-[2-(5-benzyloxy-3-indolyl)ethyl]-4-(4-methylphenyl)piperazine (1.8 g., 0.004 mole) prepared above in Example 172 was dissolved in 225 ml. absolute ethanol and reduced over 0.5 g. of 10% palladium-on-charcoal under 51 p.s.i. of hydrogen. Reduction was complete in about three hours. The solution was filtered from the catalyst and the filtrate concentrated to dryness. The residual solid was recrystallized from ethanol to give 1-[2-(5-hydroxy-3-indolyl)ethyl]-4-(4-methylphenyl)piperazine, M.P. 193.2–195.8° C. (corr.).

Analysis.—Calcd. for C₂₁H₂₅N₃O: C, 75.19; H, 7.51; N, 12.53. Found: C, 75.18; H, 7.75; N, 12.16.

A small amount of the base was converted to the methanesulfonic acid salt. The latter was recrystallized from an acetonitrile-ethyl acetate mixture to give 1-[2-(5-hydroxy-3-indolyl)ethyl-]-4-(4-methylphenyl)piperazine methanesulfonate, M.P. 233–235° C. (uncorr.).

Analysis.—Calcd. for C₂₂H₂₉N₃O₄S: N, 9.74. Found: N, 9.42.

Example 227

1-[2-(5-hydroxy-3-indolyl)ethyl]-4-phenethylpiperazine [Ia; $R_1$ is 5-HO, $R_2$ is C₆H₅CH₂CH₂, $R_3$, $R_4$, $R_5$, $R_6$ and X are H, $n$ is 2, $m$ is 1], was prepared from 1.9 g. (0.004 mole) of the 1-[2-(5-benzyloxy-3-indolyl)ethyl]-4-phenethylpiperazine prepared above in Example 173 according to the manipulative procedure described above in Example 226. The crude product was recrystallized from ethyl acetate to give 1.4 g. of 1-[2-(5-hydroxy-3-idolyl)ethyl]-4-phenethylpiperazine, M.P. 198.0–201.6° C. (corr.).

Analysis.—Calcd. for C₂₂H₂₇N₃O: C, 75.61; H, 7.79; N, 12.03. Found: C, 75.46; H, 7.63; N, 11.83.

Example 228

1-[2-(1-methyl-3-indolyl)ethyl]-4-phenylpiperazine [Ia; $R_1$, $R_3$, $R_5$, $R_6$ and X are H, $R_2$ is $C_6H_5$, $R_4$ is $CH_3$, n is 2, m is 1]: To a stirred solution of 0.83 g. (0.036 atom) of sodium in 300 ml. of liquid ammonia under nitrogen was added 10.0 g. (0.033 mole) of 1-[-2-(3-indolyl)ethyl]-4-phenylpiperazine prepared above in Example 138. The mixture was stirred for about one hour during which time the indole dissolved completely. To the solution was then added a solution of 5.23 g. (0.036 mole) of methyl iodide in 100 ml. of ether and an additional 500 ml. of liquid ammonia. The mixture was stirred for three hours and then allowed to stand at room temperature for two days. An additional 300 ml. of ether was added and the unreacted sodamide destroyed by the addition of 50 ml. of water. The organic layer was separated, dried over anhydrous sodium sulfate and the solid that separated from the dried solution was collected and extracted with chloroform. The chloroform solution was evaporated and the residual solid recrystallized from methanol giving 4.7 g. of 1-[2-(1-methyl-3-indolyl)ethyl]-4-phenylpiperazine, M.P. 93.8–95.6° C. (corr.).

*Analysis.*—Calcd. for $C_{21}H_{25}N_3$: $N_T$, 13.16; $N_B$, 8.78. Found: $N_T$, 12.91; $N_B$, 8.89.

Example 229

1-[2-(1,2-dimethyl-5,6-methylenedioxy-3-indolyl)ethyl]-4-(2-methoxyphenyl)piperazine [Ia; $R_1$ is 5,6-$OCH_2O$, $R_2$ is 2-$CH_3OC_6H_4$, $R_3$ and $R_4$ are $CH_3$, $R_5$, $R_6$ and X are H, n is 2, m is 1], was prepared from 8.0 g. (0.020 mole) of 1-[2-(2-methyl-5,6-methylenedioxy-3-indolyl)ethyl]-4-(2-methoxyphenyl)piperazine prepared above in Example 220, 0.5 g. (0.022 atom) of sodium in 400 ml. of liquid ammonia, and 3.5 g. (0.024 mole) of methyl iodide using the manipulative procedure described above in Example 228. There was thus obtained 7.8 g. of 1-[2-(1,2-dimethyl-5,6-methylenedioxy-3-indolyl)ethyl]-4-(2-methoxyphenyl)piperazine, M.P. 118.2–119.6° C. (corr.).

*Analysis.*—Calcd. for $C_{24}H_{29}N_3O_3$: C, 70.73; H, 7.17; $N_B$, 6.77. Found: C, 70.93; H, 7.50; $N_B$, 6.77.

Example 230

1-[2-(1-benzyl-2-methyl-5,6-methylenedioxy-3-indolyl)ethyl]-4-(2-methoxyphenyl)piperazine [Ia; $R_1$ is 5,6-$OCH_2O$, $R_2$ is 2-$CH_3OC_6H_4$, $R_3$ is $CH_3$, $R_4$ is $C_6H_5CH_2$, $R_5$, $R_6$ and X are H, n is 2, m is 1], was prepared from 8.0 g. (0.020 mole) of 1-[2-(2-methyl-5,6-methylenedioxy-3-indolyl)ethyl]-4-(2-methoxyphenyl)piperazine prepared above in Example 220, 0.5 g. (0.022 atom) of sodium in 400 ml. of liquid ammonia and 4.5 g. (0.026 mole) of benzyl bromide using the manipulative procedure described above in Example 228. There was thus obtained 3.0 g. of 1-[2-(1-benzyl-2-methyl-5,6-methylenedioxy-3-indolyl)ethyl]-4-(2-methoxyphenyl)piperazine, M.P. 169.2–170.2° C. (corr.).

*Analysis.*—Calcd. for $C_{30}H_{33}N_3O_3$: C, 79.51; H, 6.88; N, 8.69. Found: C, 79.55; H, 6.71; N, 8.72.

Examples 231–243

By following the manipulative procedure described above in Example 159 and by substituting for the 1-[(3-indolyl)glyoxalyl]-4-(2-methylphenyl)piperazine used therein the 1-[(3-indolyl(glyoxalyl]-4-substituted-piperazine of Formula IVa prepared above in Examples 92–104 (Table 3), there can be obtained the respective compounds of Formula Ia listed below in Table 12 where $R_3$, $R_5$ and $R_6$ in each is H, n in each is 2 and m in each is 1:

TABLE 12 (FORMULA Ia)

| Example | $R_1$ | $R_2$ | $R_4$ | X |
|---|---|---|---|---|
| 231 | 5-F | $CH(CH_3)_2$ | $CH(CH_3)_2$ | OH |
| 232 | 5-Cl | $CH_2CH(CH_3)_2$ | $CH_2CH(CH_3)_2$ | OH |
| 233 | 5-Br | $(CH_2)_5CH_3$ | $(CH_2)_5CH_3$ | OH |
| 234 | 5-I | $CH_2CH_2OH$ | $C_6H_5CH_2$ | OH |
| 235 | 6-$CH_3S$ | $CH(CH_3)CH_2CH_2OH$ | 4-$ClC_6H_4CH_2$ | OH |
| 236 | 6-$(CH_3)_2CHS$ | $(CH_2)_6OH$ | 4-$FC_6H_4CH_2$ | OH |
| 237 | 6-$CF_3$ | $C_6H_5CH_2$ | 4-$BrC_6H_4CH_2$ | OH |
| 238 | 6-$CH_3O$ | 4-$CH_3C_6H_4CH_2$ | 4-$IC_6H_4CH_2$ | OH |
| 239 | 6-$CH_3O$ | 4-$(CH_3)_2CHCH_2C_6H_4CH_2$ | $C_6H_5CH_2CH_2$ | OH |
| 240 | 5,6-di-$CH_3O$ | 2-pyrimidyl | H | H |
| 241 | H | 2-pyrazinyl | H | H |
| 242 | H | 2-thiazolyl | $CH_3$ | OH |
| 243 | H | 2-(1,3,5-triazinyl) | H | H |

Example 244

1-[3-(5-chloro-3-indolyl)-1-propyl]-4-benzhydrylpiperazine [Ia; $R_1$ is 5-Cl, $R_2$ is $(C_6H_5)_2CH$, $R_3$, $R_4$, $R_5$, $R_6$ and X are H, $C_{n-1}H_{2n-2}$ is $CH_2CH_2$, m is 1]: By reacting the 1-[3-(5-chloro-3-indolyl)-3-keto-1-propyl]-4-benzhydrylpiperazine prepared above in Example 105 with lithium aluminum hydride in an appropriate organic solvent, for example ether or tetrahydrofuran, according to the manipulative procedure described above in Example 159, there can be obtained 1-[3-(5-chloro-3-indolyl)-1-propyl]-4-benzhydrylpiperazine.

Example 245

1-[3-(5-chloro-3-indolyl)-3-hydroxy-1-propyl]-4-benzhydrylpiperazine [Ia; $R_1$ is 5-Cl, $R_2$ is $(C_6H_5)_2CH$, $R_3$, $R_4$, $R_5$ and $R_6$ are H, X is OH, $C_{n-1}H_{2n-2}$ is $CH_2CH_2$, m is 1]: By reacting the 1-[3-(5-chloro-3-indolyl)-3-keto-1-propyl]-4-benzhydrylpiperazine prepared above in Example 105 with sodium borohydride in an appropriate organic solvent, for example ether, tetrahydrofuran or methanol, using the manipulative procedure described above in Example 159 for isolating the product, there can be obtained 1-[3-(5-chloro-3-indolyl)-3-hydroxy-1-propyl]-4-benzhydrylpiperazine.

Examples 246–252

By reacting the compounds prepared above in Examples 106–112 with lithium aluminum hydride according to the manipulative procedure described above in Example 105, there can be obtained the respective compounds of Formula Ia listed below in Table 13 where $R_5$ and $R_6$ in each is H, X in each is OH and m in each is 1:

are H and m in each is 1. The melting points are corrected unless noted otherwise.

TABLE 13 (FORMULA Ia)

| Example | $R_1$ | $R_2$ | $R_3/R_4$ | $C_{n-1}H_{2n-2}$ |
|---|---|---|---|---|
| 246 | 5-Cl | $(C_6H_5)_2CH$ | H / $CH_3$ | $(CH_2)_2$ |
| 247 | H | $C_6H_5$ | $C_6H_5$ / $C_6H_5CH_2$ | $(CH_2)_3$ |
| 248 | 6-n-$C_4H_9O$ | $CH_3$ | H / 4-$CH_3SC_6H_4CH_2CH_2$ | $(CH_2)_3$ |
| 249 | 5,6,7-tri-$CH_3O$ | $CH_3$ | H / 4-n-$C_4H_9OC_6H_4CH_2CH_2$ | $(CH_2)_3$ |
| 250 | H | $CH_3$ | H / 3-$HOC_6H_4CH_2CH_2$ | $(CH_2)_3$ |
| 251 | H | $CH_3$ | H / $C_6H_5CH=CHCH_2$ | $(CH_2)_3$ |
| 252 | 3,4,5-$(CH_3O)_3C_6H_2CH_2O$ | $CH_3$ | H / $CH_3$ | $(CH_2)_3$ |

Example 253

1-[2-(3-indolyl)ethyl]-4-phenylpiperazine [Ia; $R_1$, $R_3$, $R_4$, $R_5$, $R_6$ and X are H, $R_2$ is $C_6H_5$, n is 2, m is 1]: By reacting the 1-[2-(3-indolyl)-1-ketoethyl]-4-phenylpiperazine obtained above in Example 113 with lithium aluminum hydride in an appropriate organic solvent, for example ether or tetrahydrofuran, according to the manipulative procedure described above in Example 159, there can be obtained 1-[2-(3-indolyl)ethyl]-4-phenylpiperazine.

Example 254

1-[3-(3-indolyl)propyl]-4-phenylpiperazine [Ia; $R_1$, $R_3$, $R_4$, $R_5$ $R_6$ and X are H, $R_2$ is $C_6H_5$, $C_{n-1}H_{2n-2}$ is $CH_2CH_2$, m is 1], was prepared from 20 g. (0.060 mole) of 1-[3-(3-indolyl)-1-ketopropyl]-4-phenylpiperazine, prepared above in Example 114, and 10.8 g. (0.360 mole) of lithium aluminum hydride in 600 ml. of tetrahydrofuran according to the manipulative procedure described above in Example 159. The crude product was recrystallized from absolute ethanol to give 10 g. of 1-[3-(3-indolyl)propyl]-4-phenylpiperazine, M.P. 126.6–127.8° C. (corr.).

*Analysis.*—Calcd. for $C_{21}H_{25}N_3$: $N_T$, 13.15; $N_B$, 8.76. Found: $N_T$, 13.11; $N_B$, 8.50.

Example 255

1-[3-(1-indolyl)propyl]-4-phenylpiperazine [Ic; $R_1$, $R_3$, $R_5$, $R_6$ and X are H, $R_2$ is $C_6H_5$, $C_{n-1}H_{2n-2}$ is $CH_2CH_2$, m is 1], was prepared from 37 g. (0.111 mole) of 1-[3-(1-indolyl)-1-ketopropyl]-4-phenylpiperazine prepared above in Example 115 and 16.9 g. (0.444 mole) of lithium aluminum hydride in one liter of tetrahydrofuran according to the manipulative procedure described above in Example 159. The crude product was recrystallized from methanol to give 19 g. of 1-[3-(1-indolyl)propyl]-4-phenylpiperazine, M.P. 96.7–98.4° C. (corr.).

*Analysis.*—Calcd. for $C_{21}H_{25}N_3$: C, 78.96; H, 7.89; $N_B$, 8.78. Found: C, 78.81; H, 7.65; $N_B$, 8.47.

Examples 256–266

By following the manipulative procedure described above in Example 254, substituting for the 1-[3-(3-indolyl)-1-ketopropyl]-4-phenylpiperazine used therein the 1-[(3-indolyl)-α-keto-lower-alkyl] - 4 - substituted-piperazines prepared above in Examples 116 to 126, there were obtained the respective compounds of Formula Ia listed below in Table 14 in which $R_3$, $R_4$, $R_5$, $R_6$ and X in each are H and m in each is 1. The melting points are corrected unless noted otherwise.

TABLE 14 (FORMULA Ia)

| Ex. | $R_1/R_2$ | $C_{n-1}H_{2n-2}$ | M.P., °C. | Analysis Calcd. | Analysis Found |
|---|---|---|---|---|---|
| 256 | H / 3-$CH_3OC_6H_4$ | $CH_2$ | 146.4–7.6 | $N_T$, 12.53; $N_B$, 8.36 | $N_T$, 12.34; $N_B$, 8.26 |
| 257 | H / 2-$ClC_6H_4$ | $CH_2CH_2$ | 140.8–3.6 | $N$, 11.87; Cl, 10.02 | N, 11.95; Cl, 9.90 |
| 258 | H / 2-$CH_3C_6H_4$ | $CH_2CH_2$ | 102.4–4.2 | $N_T$, 12.60; $N_B$, 8.40 | $N_T$, 12.61; $N_B$, 8.39 |
| 259 | H / 2-$CH_3OC_6H_4$ | $CH_2CH_2$ | 156.8–9.2 | $N_T$, 12.03; $N_B$, 8.02 | $N_T$, 11.83; $N_B$, 7.96 |
| 260 | H / $C_6H_5$ | $(CH_2)_3$ | 96.0–100.8 | $N_T$, 4.20; $N_B$, 8.40 | $N_T$, 4.25; $N_B$, 8.32 |
| 261 | H / 2-$CH_3OC_6H_4$ | $(CH_2)_3$ | 120.6–3.8 | $N_T$, 11.56; $N_B$, 7.70 | $N_T$, 11.53; $N_B$, 7.60 |
| 262 | H / 3-$CH_3OC_6H_4$ | $(CH_2)_3$ | [1] 234.2–5.8 | N, 10.51; Cl, 8.87 | N, 10.62; Cl, 9.00 |
| 263 | 6-$CH_3O$ / $C_6H_5$ | $CH_2CH_2$ | 196.4–7.6 | $N_T$, 12.03; $N_B$, 4.01 | $N_T$, 11.88; $N_B$, 3.98 |
| 264 | 6-$CH_3O$ / 2-$CH_3OC_6H_4$ | $CH_2CH_2$ | 153.2–5.0 | $N_T$, 11.07; $N_B$, 7.37 | $N_T$, 10.93; $N_B$, 7.26 |
| 265 | 5,6-di-$CH_3O$ / 3-$ClC_6H_4$ | $CH_2$ | [1] 236.8–9.2 | C, 60.55; H, 6.24; Cl, 16.25 | C, 60.66; H, 6.01; Cl, 16.50 |
| 266 | 5,6-O$CH_2$O / $C_6H_5$ | $CH_2CH_2$ | 142.6–4.2 | $N_T$, 11.56; $N_B$, 7.71 | $N_T$, 11.20; $N_B$, 7.62 |

[1] Hydrochloride salt.

Example 267

1-(2-indolylmethyl)-4-phenylpiperazine [Ib; $R_1$, $R_4$, $R_5$, $R_6$ and X are H, $R_2$ is $C_6H_5$, n is 1, m is 1]: By reacting the 1-(2-indolylcarbonyl) - 4 - phenylpiperazine prepared above in Example 127 with lithium aluminum hydride in an appropriate organic solvent, for example ether or tetrahydrofuran, according to the manipulative procedure described above in Example 159, there can be obtained 1-(2-indolylmethyl)-4-phenylpiperazine.

Examples 268–277

By reacting the compounds prepared above in Examples 128–137 with lithium aluminum hydride in an appropriate organic solvent, for example ether or tetrahydrofuran, according to the manipulative procedure described above in Example 159, there can be obtained the respective compounds of Formula Ia listed below in Table 15, where $R_3$, $R_4$, $R_5$, $R_6$ and X in each is H:

TABLE 15 (FORMULA Ia)

| Example | $R_1$ | $R_2$ | n | m |
|---|---|---|---|---|
| 268 | H | $C_6H_5$ | 1 | 1 |
| 269 | 4-$C_2H_5$ | $C_6H_5CH_2CH_2$ | 2 | 1 |
| 270 | 5-$(CH_3)_2CH$ | 4-$CH_3SC_6H_4CH_2CH_2$ | 2 | 1 |
| 271 | 6-$CH_3(CH_2)_4$ | 4-$(CH_3)_2CHSC_6H_4CH_2CH_2$ | 2 | 2 |
| 272 | 7-$(CH_3)_3C$ | 3,4-O$CH_2$O—$C_6H_3CH_2CH_2$ | 2 | 2 |
| 273 | H | 2-$C_5H_4N$ | 2 | 1 |
| 274 | H | 2-pyrimidyl | 2 | 2 |
| 275 | 5,6-di-$CH_3O$ | 2-pyrazinyl | 2 | 2 |
| 276 | 5,6-O$CH_2O$ | 2-thiazolyl | 2 | 1 |
| 277 | 5,6-O$CH_2CH_2$O | 2-(1,3,5-triazinyl) | 2 | 1 |

Example 278

1-(3-indolylmethyl)-4-phenylpiperazine [Ia; $R_1$, $R_3$, $R_4$, $R_5$, $R_6$ and X are H, $R_2$ is $C_6H_5$, $n$ and $m$ are 1]: A solution of 6.25 ml. of formalin and 13.3 g. (0.082 mole) of 1-phenylpiperazine in 100 ml. of dioxane was cooled to 5–10° C., and a solution of 9.0 g. (0.077 mole) of indole in 100 ml. of dioxane was added with stirring over a period of about twenty minutes. When about half of the indole solution had been added, about 20 ml. of glacial acetic acid was poured into the reaction mixture. The reaction mixture was allowed to stand at room temperature for about eighteen hours and then diluted with 400 ml. of water and extracted once with ether. The aqueous layer was separated and basified with aqueous sodium hydroxide and extracted with ether. The organic extracts on drying and evaporating afforded a yellow solid which was recrystallized from ethanol to give 7.0 g. of 1-(3-indolylmethyl) - 4 - phenylpiperazine, M.P. 184.6–6.8° C. (corr.).

*Analysis.*—Calcd. for $C_{19}H_{21}N_3$: $N_T$, 14.42; $N_B$, 4.81. Found: $N_T$, 14.34; $N_B$, 4.90.

Example 279

1-(5,6-dimethoxy-3-indolylmethyl - 4 - phenylpiperazine [Ia; $R_1$ is 5,6-di-$CH_3O$, $R_2$ is $C_6H_5$, $R_3$, $R_4$, $R_5$, $R_6$ and X are H, $m$ and $n$ are 1], was prepared from 5.0 g. (0.028 mole) of 5,6-dimethoxyindole, 4.9 g. (0.03 mole) of N-phenylpiperazine and 2.2 ml. of formalin and 5 cc. of glacial acetic acid using the manipulative procedure described above in Example 278. The product was recrystallized from benzene giving 4.7 g. of 1-(5,6-dimethoxy-3-indolylmethyl)-4-phenylpiperazine, M.P. 159.2–160.2° C. (corr.).

*Analysis.*—Calcd. for $C_{21}H_{25}N_3O_2$: $N_T$, 11.96; $N_B$, 7.97. Found: $N_T$, 11.36; $N_B$, 7.76.

Examples 280–288

By following the manipulative procedure described above in Example 278 and by replacing the 1-phenylpiperazine used therein with an appropriate 1-substituted-piperazine or 1-substituted-homopiperazine, there can be obtained the compounds of Formula Ia listed below in Table 16 where $R_3$, $R_4$, $R_5$, $R_6$ and X in each is H, and $n$ in each is 1:

TABLE 16 (FORMULA Ia)

| Example | $R_1$ | $R_2$ | $m$ |
|---|---|---|---|
| 280 | H | $(C_6H_5)_2CH$ | 1 |
| 281 | H | $(4-ClC_6H_4)_2CH$ | 2 |
| 282 | H | $C_6H_5CH=CHCH_2$ | 2 |
| 283 | H | $4-ClC_6H_4CH=CHCH_2$ | 1 |
| 284 | 6-$CH_3O$ | 2-$C_5H_4N$ | 1 |
| 285 | 5,6-di-$CH_3O$ | 2-pyrimidyl | 2 |
| 286 | 5,6-$OCH_2O$ | 2-pyrazinyl | 1 |
| 287 | 5,6-$OCH_2CH_2O$ | 2-thiazolyl | 2 |
| 288 | H | 2-(1,3,5-triazinyl) | 2 |

Example 289

1-[2-(3-indolyl)ethyl]-4-methylpiperazine [Ia; $R_1$, $R_3$, $R_4$, $R_5$, $R_6$ and X are H, $R_2$ is $CH_3$, $n$ is 2, $m$ is 1]: By reacting the 1-[2-(3-indolyl)ethyl]-4-methyl-2-piperazinone prepared above in Example 2 with lithium aluminum hydride in an appropriate organic solvent, for example ether or tetrahydrofuran, according to the manipulative procedure described above in Example 159, there can be obtained 1-[2-(3-indolyl)ethyl]-4-methylpiperazine.

Examples 290–301

By reacting the compounds prepared above in Examples 4, 5, 6, 7, 8, 16 and 17–22 with lithium aluminum hydride in an appropriate organic solvent, for example ether or tetrahydrofuran, according to the manipulative procedure above in Example 159, there can be obtained the respective compounds of Formula Ia listed below in Table 17 where $R_3$, $R_4$ and X in each is H:

TABLE 17 (FORMULA Ia)

| Example | $R_1$ | $R_2$ | $R_5$ | $R_6$ | $n$ | $m$ |
|---|---|---|---|---|---|---|
| 290 | H | $C_6H_5$ | 3-$CH_3$ | H | 2 | 1 |
| 291 | H | $CH_3$ | H | 6-$CH_3$ | 2 | 1 |
| 292 | H | $CH_3$ | 3-$CH(CH_3)_2$ | H | 2 | 1 |
| 293 | H | $CH_3$ | H | 2-$CH_3$ | 2 | 2 |
| 294 | H | $CH_3$ | 6-$CH_3$ | 2-$CH_3$ | 2 | 2 |
| 295 | H | $C_6H_5$ | H | H | 2 | 1 |
| 296 | H | 4-$ClC_6H_4$ | H | H | 2 | 1 |
| 297 | H | 2,6-$(CH_3)_2C_6H_3$ | H | H | 2 | 1 |
| 298 | H | $C_6H_5$ | H | 6-$CH_3$ | 2 | 1 |
| 299 | H | $C_6H_5$ | 3-$CH(CH_3)_2$ | H | 2 | 1 |
| 300 | H | $C_6H_5$ | H | 3-$CH_3$ | 2 | 2 |
| 301 | H | $C_6H_5$ | 6-$CH_3$ | 3-$CH_3$ | 2 | 2 |

Example 302

1-{3-[2-(4-methylsulfinylphenyl) - 3 - indolyl]-2-ethylpropyl}-4-methylpiperazine [Ia; $R_1$, $R_4$, $R_5$, $R_6$ and X are H, $R_2$ is $CH_3$, $R_3$ is 4-$CH_3SOC_6H_4$, $C_{n-1}H_{2n-2}$ is $CH(C_2H_5)CH_2$, $m$ is 1]: By reacting the 1{3-[2-(4-methylmercaptophenyl)-3-indolyl]-2-ethylpropyl} - 4 - methylpiperazine prepared above in Example 158 with one molar equivalent of peracetic acid (hydrogen peroxide dissolved in glacial acetic acid) in an appropriate organic solvent, for example ethanol, at a temperature between about 0° C. and about 25° C., there can be obtained 1-{3-[2-(4-methylsulfinylphenyl)-3-indolyl]-2-ethylpropyl}-4 - methylpiperazine.

Examples 303–310

By following the manipulative procedure described above in Example 302, substituting for the 1-{3-[2-(4-methylmercaptophenyl) - 3 - indolyl] - 2 - ethylpropyl} - 4-methylpiperazine used therein the compounds prepared above in Examples 174, 175, 188, 235, 236, 248, 270 and 271, there can be obtained the respective compounds of Formula Ia listed below in Table 18 where $R_3$, $R_5$ and $R_6$ are H and $m$ in each is 1:

TABLE 18 (FORMULA Ia)

| Example | $R_1/R_2$ | $R_4$ | X | $C_{n-1}H_{2n-2}$ |
|---|---|---|---|---|
| 303 | 5-$CH_3SO$ / $C_6H_5$ | H | H | $CH_2$ |
| 304 | 5-$CH_3SO$ / 4-$CH_3C_6H_4$ | H | H | $CH_2$ |
| 305 | 5,6-di-$CH_3O$ / 4-$CH_3SOC_6H_4$ | H | H | $CH_2$ |
| 306 | 6-$CH_3SO$ / $CH(CH_3)CH_2CH_2OH$ | 4-$ClC_6H_4CH_2$ | OH | $CH_2$ |
| 307 | 6-$(CH_3)_2CHSO$ / $(CH_2)_6OH$ | 4-$FC_6H_4CH_2$ | OH | $CH_2$ |
| 308 | 6-n-$C_4H_9O$ / $CH_3$ | 4-$CH_3SOC_6H_4CH_2C_6H_2$ | OH | $(CH_2)_3$ |
| 309 | 5-$(CH_3)_2CH$ / 4-$CH_3SOC_6H_4CH_2CH_2$ | H | H | $CH_2$ |
| 310 | 6-$CH_3(CH_2)_4$ / 4-$(CH_3)_2CHSOC_6H_4CH_2CH_2$ | H | H | $CH_2$ |

Example 311

1-{3-[2-(4-methylsulfonylphenyl)-3-indolyl]-2-ethyl-propyl}-4-methylpiperazine [Ia; $R_1$, $R_4$, $R_5$, $R_6$ and X are H, $R_2$ is $CH_3$, $R_3$ is $4\text{-}CH_3SO_2C_6H_4$, $C_{n-1}H_{2n-2}$ is $$CH(C_2H_5)CH_2,$$

m is 1]: By reacting the 1-{3-[2-(4-methylmercaptophenyl)-3-indolyl]-2-ethylpropyl}-4-methylpiperazine prepared above in Example 158 with slightly more than two molar equivalents of peracetic acid (hydrogen peroxide in glacial acetic acid) in an appropriate organic solvent, for example glacial acetic acid, at a temperature between about 20° C. and about 100° C., there can be obtained 1-{3-[2-(4-methylsulfonylphenyl)-3-indolyl]-2-ethyl-propyl}-4-methylpiperazine.

Examples 312-319

By following the manipulative procedure described above in Example 311 substituting for the 1-{3-[2-(4-methylmercaptophenyl)-3-indolyl]-2-ethylpropyl}-4-methylpiperazine used therein the compounds prepared above in Examples 174, 175, 188, 235, 236, 248, 270 and 271, there can be obtained the respective compounds of Formula Ia listed below in Table 19 where $R_3$, $R_5$ and $R_6$ in each is H and m in each is 1:

The product was recrystallized from benzene giving 8.9 g. of 1-[2-(5,6-dimethoxy-3-indolyl)ethyl]piperazine, M.P. 109.6–111.4° C. (corr.).

*Analysis.*—Calcd. for $C_{16}H_{23}N_3O_2$: $N_T$, 14.52; $N_B$, 9.68. Found: $N_T$, 14.32; $N_B$, 9.45.

Examples 322-325

By following the manipulative procedure described above in Example 320, substituting for the 1-[2-(3-indolyl)ethyl]-4-benzylpiperazine used therein the compounds prepared above in Examples 239, 244, 245 and 246, there can be obtained the respective compounds of Formula Ia listed below in Table 20 where $R_2$, $R_3$, $R_5$ and $R_6$ in each is H and m in each is 1:

TABLE 20 (FORMULA Ia)

| Example | $R_1$ | $R_4$ | X | $C_{n-1}H_{2n-2}$ |
|---|---|---|---|---|
| 322 | 6-$CH_3O$ | $C_6H_5CH_2CH_2$ | OH | $CH_2$ |
| 323 | 5-Cl | H | H | $(CH_2)_2$ |
| 324 | 5-Cl | H | OH | $(CH_2)_2$ |
| 325 | 5-Cl | $CH_3$ | OH | $(CH_2)_2$ |

The compounds of the invention when administered orally to mice to which 40 mg./kg. of hexobarbital had been administered produced potentiation of hexobarbital-induced sleeping time. They produced tranquilization of

TABLE 19 (FORMULA Ia)

| Example | $R_1/R_2$ | $R_4$ | X | $C_{n-1}H_{2n-2}$ |
|---|---|---|---|---|
| 312 | 5-$CH_3SO_2$ / $C_6H_5$ | H | H | $CH_2$ |
| 313 | 5-$CH_3SO_2$ / 4-$CH_3C_6H_4$ | H | H | $CH_2$ |
| 314 | 5,6-di-$CH_3O$ / 4-$CH_3SO_2C_6H_4$ | H | H | $CH_2$ |
| 315 | 6-$CH_3SO_2$ / $CH(CH_3)CH_2CH_2OH$ | 4-$ClC_6H_4CH_2$ | OH | $CH_2$ |
| 316 | 6-$(CH_3)_2CHSO_2$ / $(CH_2)_6OH$ | 4-$FC_6H_4CH_2$ | OH | $CH_2$ |
| 317 | 6-n-$C_4H_9O$ / $CH_3$ | 4-$CH_3SO_2C_6H_4C_6H_2CH_2$ | OH | $(CH_2)_3$ |
| 318 | 5-$(CH_3)_2CH$ / 4-$CH_3SO_2C_6H_4CH_2CH_2$ | H | H | $CH_2$ |
| 319 | 6-$CH_3(CH_2)_4$ / 4-$(CH_3)_2CHSO_2C_6H_4CH_2CH_2$ | H | H | $CH_2$ |

Example 320

1-[2-(3-indolyl)ethyl]piperazine [Ia; $R_1$, $R_2$, $R_3$, $R_4$, $R_5$, $R_6$ and X are H, m is 1, n is 2]: 1-[2-(3-indolyl)-ethyl]-4-benzyl piperazine (18.5 g., 0.058 mole) prepared from the 1-[(3-indolyl)glyoxalyl]-4-benzylpiperazine prepared above in Example 90 was dissolved in absolute ethanol and reduced over 10% palladium-on-charcoal under about 50 pounds p.s.i. of hydrogen with warming. When reduction was complete, the catalyst was removed by filtration, the filtrate taken to dryness and the residue recrystallized from ethyl acetate giving 10.7 g. of 1-[2-(3-indolyl)ethyl]piperazine, M.P. 149.8 – 152.0° C. (corr.).

*Analysis.*—Calcd. for $C_{14}H_{19}N_3$: $N_T$, 18.33; $N_B$, 12.22. Found: $N_T$, 18.41; $N_B$, 12.01.

Example 321

1-[2-(5,6-dimethoxy-3-indolyl)ethyl]piperazine [Ia; $R_1$ is 5,6-di-$CH_3O$, $R_2$, $R_3$, $R_4$, $R_5$, $R_6$ and X are H, m is 1, n is 2], was prepared from 17.7 g. of 1-[2-(5,6-dimethoxy-3-indolyl)ethyl]-4-benzylpiperazine, prepared above in Example 210. Reduction was carried out according to the manipulative procedure described above in Example 320.

mice when given orally as shown by their reaction to being touched lightly on the vibrissae (head withdrawal reflex). When administered orally in mice, they showed adrenolytic activity as evidenced by antagonism of the pressor effects of epinephrine. Further evidence of tranquilizing and C.N.S. depressant activity for the compounds was shown by overt behavior studies in monkeys (oral) in which the compounds produced a taming effect, sedation, skeletal muscle relaxation, hypothermia and catalepsy.

Oral toxicity studies in mice have shown that the $LD_{50}$ of the compounds is in the range from about 110 mg./kg. to about 4000 mg./kg. where $LD_{50}$ is defined as the dose fatal to 50% of the animals at that particular dose level.

In Table 21 below which summarizes the data so obtained for a number of the compounds, the effective dose, $ED_{50}$, of each of the compounds in each of the above-described tests is given in the appropriate column where the headings H.P.T., H.W.R. and A.S.T. represent the hexobarbital potentiation test, head withdrawal reflex and adrenolytic screening test respectively, and in the column headed "Over Behavoir," the letters T, S, R, H and C represent taming, sedation, relaxation (muscle), hypothermia and catalepsy, respectively.

Each of the compounds is identified by the number of the example above in which its preparation was described.

TABLE 21

| Ex. | H.P.T. ED$_{50}$ (mg./kg.) | H.W.R. ED$_{50}$ (mg./kg.) | A.S.T. ED$_{50}$ γ/kg. | LD$_{50}$ (mg./kg.) | Overt behavior M.E.D. (mg./kg.) |
|---|---|---|---|---|---|
| 161 | | | | | S, T and H, 64. |
| 163 | 13.8±3.9 | 18.5±5.1 | 13.4±2.1 | 440 | S, T, C and H, 32. |
| 166 | 8.2±1.5 | 9.1±2.1 | 65±8.4 | 3,090 | T, C and H, 8. |
| 167 | 4.7±1.0 | 13.4±3.5 | 28 ±5.6 | | S, T and H, 8; R and C, 32. |
| 170 | 6.6±1.4 | 6.5±1.6 | 11.3±3.5 | 190 | S, T and H, 4; R and C, 16. |
| 176 | 8.0±1.6 | 40±12 | 40±5.2 | >4,000 | S and H, 8; C, 64. |
| 178 | 5.4±0.7 | 8.0±1.9 | 53.5±8.8 | 500 | S, T, H and C, 16. |
| 180 | 6.8±1.6 | 6.5±1.2 | 7±2 | 2,680 | |
| 181 | 8.8±2.6 | 22±7.6 | 57±10.2 | | S, T, C and H, 64. |
| 182 | 5.6±0.7 | 6.4±1.8 | 38±14.7 | 220 | S, T, C and H, 32. |
| 183 | 3.2±1.2 | 13.4±4.0 | 73±.20.5 | | S, T and H, 16. |
| 184 | 8.0±2.7 | 43±15.0 | 88±8.1 | 410±176 | T, S and H, 64. |
| 185 | 4.9±1.1 | 4.9±0.84 | 5.5±2.1 | 110 | T, S, C and H, 32. |
| 186 | 5.2±1.8 | 10.6±1.6 | 160±28.9 | | T, S, C and H, 16. |
| 187 | 13.2±3.7 | 61±14.2 | 254±30.9 | | |
| 189 | 7.7±1.1 | 14.6±3.1 | | | T, C and H, 16. |
| 190 | 5.0±1.3 | >128 | 66.5±8.7 | | S, T, R and H, 64. |
| 191 | 3.7±0.57 | 6.5±2.1 | 97±15.6 | | T, C and H, 4. |
| 194 | 47±7.6 | 47±17.1 | | | |
| 225 | 60±14.9 | >128 | | | |
| 255 | 102±41.8 | | | | |

The compounds of Formula XV, in addition to being useful as intermediates for the preparation of the compounds of Formulae Ia, b and c, have also been shown to possess a depressant action on the central nervous system. They protect mice from the hind limb extensor component of maximal electroshock seizures. These results indicate their usefulness as central nervous system depressants, and in particular as anticonvulsant agents. Thus 1-(2,6-dimethylphenyl)-2-piperazinone hydrochloride, prepared above in Example 11, protected seven out of ten mice for one hour against electroshock-induced convulsions at a dose of 400 mg./kg.

The compounds of Formulae Ia, b and c can be prepared for use by dissolving under sterile conditions a salt form of the compounds in water (or an equivalent amount of a non-toxic acid if the free base is used), or in a physiologically compatible aqueous medium such as saline, and stored in ampoules for intramuscuar injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further, the compounds can be formulated for oral administration in aqueous alcohol, glycol or oil solutions or oil-water-emulsions in the same manner as conventional medicinal substances are prepared. When used as hypotensive agents they are formulated and used in the same manner as conventional hypotensive agents, such as reserpine preparations, and indeed can be used advantageously in combination with such hypotensive agents.

When the compounds of Formula XV are used as anticonvulsant agents, they can be prepared for oral administration in solid form either with or without the aid of a carrier. Thus, the compounds can be formulated in unit dosage form as tablets in combination with a suitable adjuvant such as one or more of the following: calcium carbonate, starch, gelatin, talc, magnesium stearate, acacia, and the like; or alternatively, they can be employed in capsule form either alone or admixed with an adjuvant. Alternatively, the compounds can be formulated for oral administration as an aqueous suspension, aqueous alcohol solutions, oil solutions, or oil-water emulsions, in the same manner in which conventional medicinal substances are formulate.

I claim:
1. A member of the group consisting of compounds of the formula

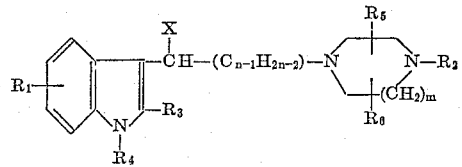

compounds of the formula

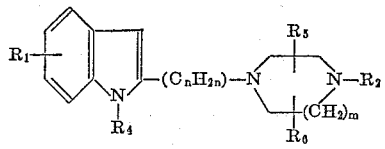

and compounds of the formula

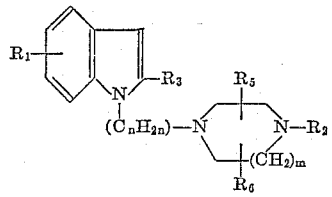

wherein $R_1$ is a member of the group consisting of a hydrogen atom and from one to four substituents selected from the group consisting of halogen, lower-alkyl, lower-alkoxy, hydroxy, methylenedioxy, ethylenedioxy, lower-alkylmercapto, lower-alkylsulfinyl, lower-alkylsulfonyl, trifluoromethyl, lower-alkanoyloxy, benzyloxy, and benzyloxy substituted by from one to three substituents selected from the group consisting of halogen, lower-alkyl, lower-alkoxy, hydroxy, methylenedioxy, ethylenedioxy, lower-alkylmercapto, lower-alkylsulfinyl, lower-alkylsulfonyl, trifluoromethyl, and lower-alkanoyloxy; $R_2$ is a member of the group consisting of hydrogen, lower-alkyl, hydroxy-lower-alkyl, phenyl, benzyl, phenethyl, benzhydryl, cinnamyl, pyrimidyl, pyrazinyl, pyridyl, thiazolyl, oxazolyl, 1,3,5-triazinyl, and thienyl; $R_3$ is a member of the group consisting of hydrogen, lower-alkyl, and phenyl; $R_4$ is a member of the group consisting of hydrogen, lower-alkyl, phenyl, benzyl, phenethyl, and cinnamyl and wherein the benzene ring of the phenyl, benzyl, phenethyl, and cinnamyl moieties of the groups $R_2$, $R_3$, and $R_4$ can be substituted by from one to two substituents selected from the group consisting of halogen, lower-alkyl, hydroxy, lower-alkoxy, methylenedioxy, ethylenedioxy, lower-alkylmercapto, lower-alkylsulfinyl, lower-alkylsulfonyl, and trifluoromethyl; $R_5$ and $R_6$ each is a member of the group consisting of hydrogen and lower-alkyl; X is a member of the group consisting of hydrogen and hydroxyl; $m$ is an integer from 1 to 2; and $n$ is an integer from 1 to 7.

2. A compound of the formula

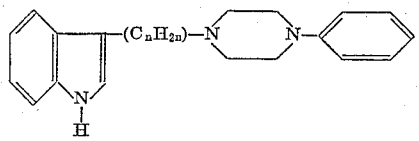

wherein $n$ is an integer from 1 to 7.

3. A compound of the formula

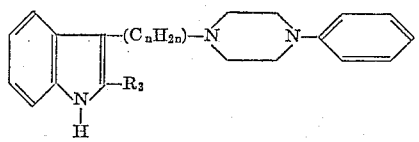

wherein $R_3$ is lower-alkyl and n is an integer from 1 to 7.

4. A compound of the formula

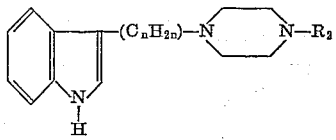

wherein $R_2$ is lower-alkoxyphenyl and $n$ is an integer from 1 to 7.

5. A compound of the formula

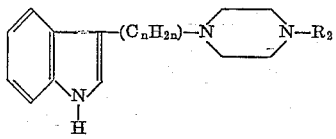

wherein $R_2$ is lower-alkylphenyl and $n$ is an integer from 1 to 7.

6. A compound of the formula

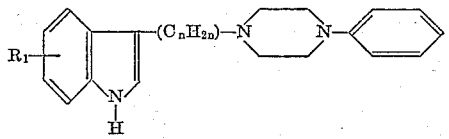

wherein $R_1$ is lower-alkoxy, and $n$ is an integer from 1 to 7.

7. A compound of the formula

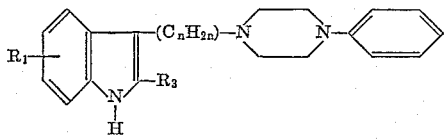

wherein $R_1$ is lower-alkoxy, $R_3$ is lower-alkyl, and $n$ is an integer from 1 to 7.

8. A compound of the formula

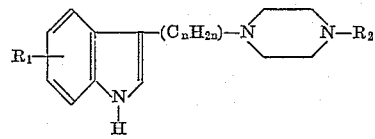

wherein $R_1$ is lower-alkoxy, $R_2$ is lower-alkoxyphenyl, and $n$ is an integer from 1 to 7.

9. A compound of the formula

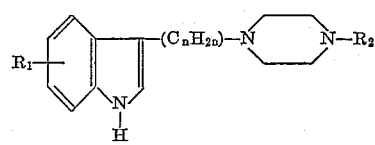

wherein $R_1$ is lower-alkoxy, $R_2$ is lower-alkoxyphenyl, $R_3$ is lower-alkyl, and $n$ is an integer from 1 to 7.

10. A compound of the formula

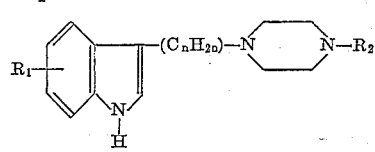

wherein $R_1$ is lower-alkoxy, $R_2$ is lower-alkylphenyl, and $n$ is an integer from 1 to 7.

11. A compound of the formula

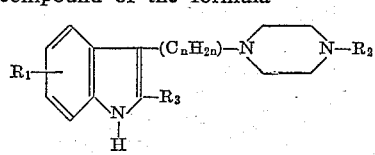

wherein $R_1$ is lower-alkoxy, $R_2$ is lower-alkylphenyl, $R_3$ is lower-alkyl, and $n$ is an integer from 1 to 7.

12. A compound of the formula

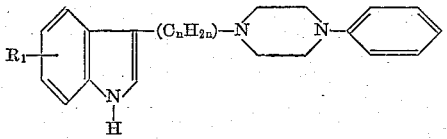

wherein $R_1$ is methylenedioxy and $n$ is an integer from 1 to 7.

13. A compound of the formula

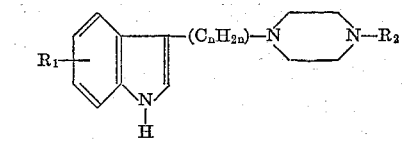

wherein $R_1$ is methylenedioxy, $R_2$ is lower-alkoxyphenyl, and $n$ is an integer from 1 to 7.

14. A compound of the formula

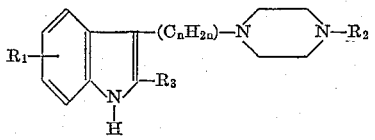

wherein $R_1$ is methylenedioxy, $R_2$ is lower-alkoxyphenyl, $R_3$ is lower-alkyl, and $n$ is an integer from 1 to 7.

15. A compound of the formula

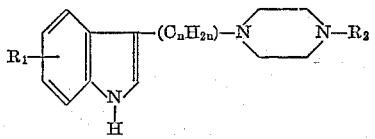

wherein $R_1$ is methylenedioxy, $R_2$ is lower-alkylphenyl, and $n$ is an integer from 1 to 7.

16. 1 - [3-(6-methoxy-3-indolyl)propyl]-4-(2-methoxyphenyl)piperazine.

17. 1 - [2-(5,6-dimethoxy-2-methyl-3-indolyl)ethyl]-4-(3-methoxyphenyl)piperazine.

18. 1 - [2-(5,6-dimethoxy-2-methyl-3-indolyl)ethyl]-4-(2-methoxyphenyl)piperazine.

19. 1 - [3 - (5,6-methylenedioxy-3-indolyl)propyl]-4-phenylpiperazine.

20. A compound of the formula

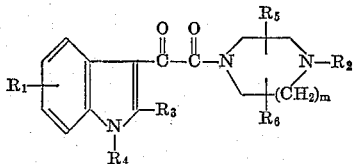

wherein $R_1$ is a member of the group consisting of a hydrogen atom and from one to four substituents selected from the group consisting of halogen, lower-alkyl, lower-alkoxy, hydroxy, methylenedioxy, ethylenedioxy, lower-alkylmercapto, lower-alkylsulfinyl, lower-alkylsulfonyl, trifluoromethyl, lower-alkanoyloxy, benzyloxy, and benzyloxy substituted by from one to three substituents selected from the group consisting of halogen, lower-alkyl, lower-alkoxy, hydroxy, methylenedioxy, ethylenedioxy, lower-alkylmercapto, lower-alkylsulfinyl, lower-alkylsulfonyl, trifluoromethyl, and lower-alkanoyloxy; $R_2$ is a member of the group consisting of hydrogen, lower-alkyl, hydroxy-lower-alkyl, phenyl, benzyl, phenethyl, benzhydryl, cinnamyl, pyrimidyl, pyrazinyl, pyridyl, thiazolyl, oxazolyl, 1,3,5-triazinyl and thienyl; $R_3$ is a member of the group consisting of hydrogen, lower-alkyl, and phenyl; $R_4$ is a member of the group consisting of hydrogen, lower-alkyl, phenyl, benzyl, phenethyl, and cinnamyl and wherein the benzene ring of the phenyl, benzyl, phenethyl, and cinnamyl moieties of the groups $R_2$, $R_3$, and $R_4$ can be substituted by from one to two substituents selected from the group consisting of halogen, lower-alkyl, hydroxy, lower-alkoxy, methylenedioxy, ethylenedioxy, lower-alkyl-mercapto, lower-alkylsulfinyl, lower-alkylsulfonyl, and trifluoromethyl; $R_5$ and $R_6$ each is a member of the group consisting of hydrogen and lower-alkyl; and $m$ is an integer from 1 to 7.

21. A member of the group consisting of compounds of the formula

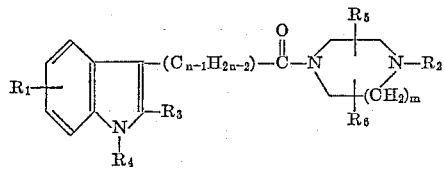

compounds of the formula

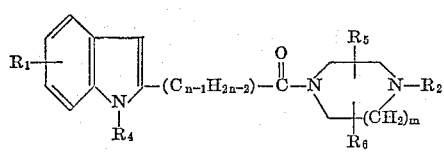

and compounds of the formula

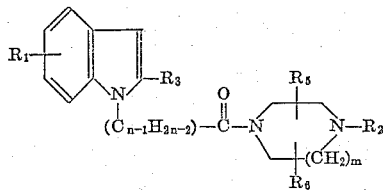

wherein $R_1$ is a member of the group consisting of a hydrogen atom and from one to four substituents selected from the group consisting of halogen, lower-alkyl, lower-alkoxy, hydroxy, methylenedioxy, ethylenedioxy, lower-alkylmercapto, lower-alkylsulfinyl, lower-alkylsulfonyl, trifluoromethyl, lower-alkanoyloxy, benzyloxy, and benzyloxy substituted by from one to three substituents selected from the group consisting of halogen, lower-alkyl, lower-alkoxy, hydroxy, methylenedioxy, ethylenedioxy, lower-alkylmercapto, lower-alkylsulfinyl, lower-alkylsulfonyl, trifluoromethyl, and lower-alkanoyloxy; $R_2$ is a member of the group consisting of hydrogen, lower-alkyl, hydroxy-lower-alkyl, phenyl, benzyl, phenethyl, benzhydryl, cinnamyl, pyrimidyl, pryazinyl, pyridyl, thiazolyl, oxazolyl, 1,3,5-triazinyl, and thienyl; $R_3$ is a member of the group consisting of hydrogen lower-alkyl, and phenyl; $R_4$ is a member of the group consisting of hydrogen, lower-alkyl, phenyl, benzyl, phenethyl, and cinnamyl and wherein the benzene ring of the phenyl, benzyl, phenethyl, and cinnamyl moieties of the groups $R_2$, $R_3$, and $R_4$ can be substituted by from one to two substituents selected from the group consisting of halogen, lower-alkyl, hydroxy, lower-alkoxy, methylenedioxy, ethylenedioxy, lower-alkylmercapto, lower-alkylsulfinyl, lower-alkylsulfonyl, and trifluoromethyl; $R_5$ and $R_6$ each is a member of the group consisting of hydrogen and lower-alkyl; $m$ is an integer from 1 to 2; and $n$ is an integer from 1 to 7.

22. A member of the group consisting of (A) compounds of the formula

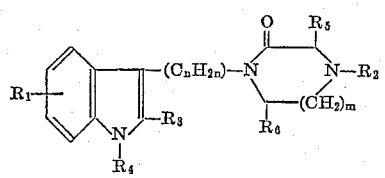

compounds of the formula

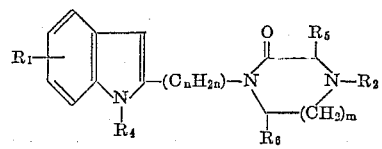

and compounds of the formula

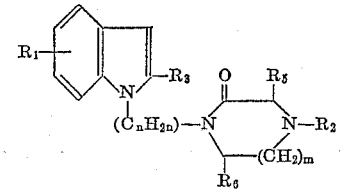

wherein $R_1$ is a member of the group consisting of a hydrogen atom and from one to four substituents selected from the group consisting of halogen, lower-alkyl, lower-alkoxy, hydroxy, methylenedioxy, ethylenedioxy, lower-alkylmercapto, lower-alkylsulfinyl, lower-alkylsulfonyl, trifluoromethyl, lower-alkanoyloxy, benzyloxy, and benzyloxy substituted by from one to three substituents selected from the group consisting of halogen, lower-alkyl, lower-alkoxy, hydroxy, methylenedioxy, ethylenedioxy, lower-alkylmercapto, lower-alkylsulfinyl, lower-alkylsulfonyl, trifluoromethyl, and lower-alkanoyloxy; $R_2$ is a member of the group consisting of hydrogen, lower-alkyl, hydroxy-lower-alkyl, phenyl, benzyl, phenethyl, benzhydryl, cinnamyl, pyrimidyl, pyrazinyl, pyridyl, thiazolyl, oxazolyl, 1,3,5-triazinyl, and thienyl; $R_3$ is a member of the group consisting of hydrogen, lower-alkyl, and phenyl; $R_4$ is a member of the group consisting of hydrogen, lower-alkyl, phenyl, benzyl, phenethyl, and cinnamyl and wherein the benzene ring of the phenyl, benzyl, phenethyl, and cinnamyl moieties of the groups $R_2$, $R_3$, and $R_4$ can be substituted by from one to two substituents selected from the group consisting of halogen, lower-alkyl, hydroxy, lower-alkoxy, methylenedioxy, ethylenedioxy, lower-alkylmercapto, lower-alkylsulfinyl, lower-alkylsulfonyl, and trifluoromethyl; $R_5$ and $R_6$ each is a member of the group consisting of hydrogen and lower-alkyl; $m$ is an integer from 1 to 2; and $n$ is an integer from 1 to 7; and (B) benzohalide quaternary ammonium salts thereof.

23. A member of the group consisting of compounds of the formula

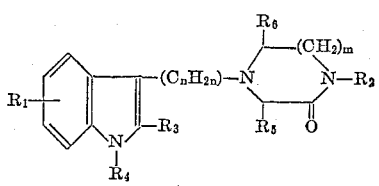

compounds of the formula

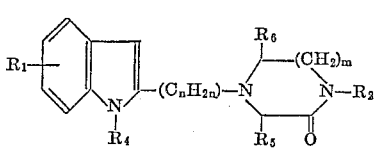

and compounds of the formula

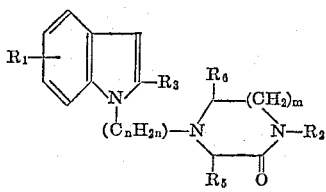

wherein $R_1$ is a member of the group consisting of a hydrogen atom and from one to four substituents selected from the group consisting of halogen, lower-alkyl, lower-alkoxy, hydroxy, methylenedioxy, ethylenedioxy, lower-alkylmercapto, lower-alkylsulfinyl, lower-alkylsulfonyl, trifluoromethyl, lower-alkanoyloxy, benzyloxy, and benzyloxy substituted by from one to three substituents selected from the group consisting of halogen, lower-alkyl, lower-alkoxy, hydroxy, methylenedioxy, ethylenedioxy, lower-alkylmercapto, lower-alkylsulfinyl, lower-alkylsulfonyl, trifluoromethyl, and lower-alkanoyloxy; $R_2$ is a member of the group consisting of hydrogen, lower-alkyl, hydroxy-lower-alkyl, phenyl, benzyl, phenethyl, benzhydryl, cinnamyl, pyrimidyl, pyrazinyl, pyridyl, thiazolyl, oxazolyl, 1,3,5-triazinyl, and thienyl; $R_3$ is a member of the group consisting of hydrogen, lower-alkyl, and phenyl; $R_4$ is a member of the group consisting of hydrogen, lower-alkyl, phenyl, benzyl, phenethyl, and cinnamyl and wherein the benzene ring of the phenyl, benzyl, phenethyl, and cinnamyl moieties of the groups $R_2$, $R_3$, and $R_4$ can be substituted by from one to two substituents selected from the group consisting of halogen, lower-alkyl, hydroxyl, lower-alkoxy, methylenedioxy, ethylenedioxy, lower-alkylmercapto, lower-alkylsulfinyl, lower-alkylsulfonyl, and trifluoromethyl; $R_5$ and $R_6$ each is a member of the group consisting of hydrogen and lower-alkyl; $m$ is an integer from 1 to 2; and $n$ is an integer from 1 to 7.

24. 1 - [2 - (3-indolyl)ethyl]-4-(2-methoxyphenyl)piperazine.
25. 1 - [2 - (6 - methoxy-3-indolyl)ethyl]-4-(2-methylphenyl)piperazine.
26. 1 - [2 - (6 - methoxy-3-indolyl)ethyl]-4-(2-methoxyphenyl)piperazine.
27. 1 - [2 - (6 - methoxy-3-indolyl)ethyl]-4-phenylpiperazine.
28. 1 - [2 - (5,6 - methylenedioxy-3-indolyl)ethyl]-4-(3-methylphenyl)piperazine.
29. 1 - [2 - (5,6 - methylenedioxy-3-indolyl)ethyl]-4-(2-methoxyphenyl)piperazine.
30. 1 - [2 - (5,6 - methylenedioxy-3-indolyl)ethyl]-4-phenylpiperazine.
31. 1 - [2 - (5,6 - dimethoxy-3-indolyl)ethyl]-4-phenylpiperazine.
32. 1 - [2 - (5,6 - dimethoxy-3-indolyl)ethyl]-4-(4-methylphenyl)piperazine.
33. 1 - [2 - (5,6 - dimethoxy-3-indolyl)ethyl]-4-(4-methoxyphenyl)piperazine.
34. 1 - [2-(5,6-dimethoxy-2-methyl-3-indolyl)ethyl]-4-phenylpiperazine.
35. 1 - [2 - (5,6-dimethoxy-3-indolyl)ethyl]-4-(2-methylphenyl)piperazine.
36. 1 - [2 - (5,6-dimethoxy-3-indolyl)ethyl]-4-(3-methylphenyl)piperazine.
37. 1 - [2 - (5,6-dimethoxy-3-indolyl)ethyl]-4-(2-methoxyphenyl)piperazine.
38. 1 - [2 - (5,6 - dimethoxy-3-indolyl)ethyl]-4-(3-methoxyphenyl)piperazine.
39. 1 - [2 - (5,6 - diethoxy-3-indolyl)ethyl]-4-phenylpiperazine.
40. 1 - [2 - (2 - methyl - 3 - indolyl)ethyl]-4-phenylpiperazine.
41. 1 - [2 - (3-indolyl)ethyl]-4-(2-pyridyl)piperazine.
42. 1 - [2 - (5,6-dimethoxy-1-methyl-3-indolyl)-2-hydroxyethyl]-4-phenylpiperazine.
43. 1 - [2 - (5,6-dimethoxy-3-indolyl)-2-hydroxyethyl]-4-(4-methylphenyl)piperazine.
44. 1-[3-(1-indolyl)propyl]-4-phenylpiperazine.
45. 1-[(3-indolyl)glyoxalyl]-4-methylpiperazine.
46. 1 - [(3 - indolyl)glyoxalyl]-4-(2-hydroxyethyl)piperazine.
47. 1 - [(6 - methoxy - 3 - indolyl)glyoxalyl]-4-phenylpiperazine.
48. 1 - [(5,6 - methylenedioxy-3-indolyl)glyoxalyl]-4-phenylpiperazine.
49. 1 - [(5,6 - dimethoxy-3-indolyl)glyoxalyl]-4-phenylpiperazine.
50. 1 - [(5,6 - dimethoxy - 3 - indolyl)glyoxalyl]-4-(3-methoxyphenyl)piperazine.
51. 1 - [(5,6 - dimethoxy-3-indolyl)glyoxalyl]-4-(2-methylphenyl)piperazine.
52. 1 - [(5,6 - dimethoxy-3-indolyl)glyoxalyl]-4-(3-methylphenyl)piperazine.
53. 1 - [(2 - methyl-3-indolyl)glyoxalyl]-4-phenylpiperazine.
54. 1 - [(1,2 - dimethyl-3-indolyl)glyoxalyl]-4-phenylpiperazine.
55. 1 - [(5,6 - dimethoxy-3-indolyl)glyoxalyl]-4-(2-pyridyl)piperazine.
56. 1-[2-(3-indolyl)-1-ketoethyl]-4-phenylpiperazine.
57. 1-[3-(3-indolyl)-1-ketopropyl]-4-phenylpiperazine.
58. 1-[3-(1-indolyl)-1-ketopropyl]-4-phenylpiperazine.
59. 1 - [2 - (3 - indolyl)ethyl]-4-methyl-2-piperazinone benzochloride.
60. 1-[2-(3-indolyl)ethyl]-4-phenyl-3-piperazinone.

References Cited by the Examiner

UNITED STATES PATENTS

| | | | |
|---|---|---|---|
| 2,633,467 | 3/53 | Benneville | 260—268 |
| 2,636,032 | 4/53 | Weston et al. | 260—268 |
| 2,649,450 | 8/53 | Strong et al. | 260—268 |
| 2,692,882 | 10/54 | Speeter et al. | 260—319 |
| 2,763,338 | 10/56 | Suter et al. | 260—562 |
| 2,773,899 | 12/56 | Martin et al. | 260—562 |
| 2,800,474 | 7/57 | Voegtle | 260—268 |
| 2,804,462 | 8/57 | Speeter | 260—319 |
| 2,857,384 | 10/58 | Druey et al. | 260—268 |
| 2,927,924 | 3/60 | Mills | 260—268 |
| 2,930,797 | 3/60 | Anthony et al. | 260—319 |
| 2,930,798 | 3/60 | Schmitt | 260—319 |
| 2,944,055 | 7/60 | Anthony | 260—319 |
| 2,984,670 | 5/61 | Szmuszkovicz | 260—319 |
| 2,991,291 | 7/61 | Szmuszkovicz | 260—319 |
| 3,026,325 | 3/62 | Heinzelman | 260—268 XR |
| 3,043,849 | 7/62 | Szmuszkovicz | 260—268 |
| 3,058,992 | 10/62 | Allais et al. | 260—319 |
| 3,067,206 | 12/62 | Kralt et al. | 260—319 |
| 3,072,530 | 1/63 | Hofmann et al. | 260—294.7 XR |
| 3,075,986 | 1/63 | Jacob et al. | 260—294.3 XR |
| 3,075,992 | 1/63 | Hofmann et al. | 260—319 |
| 3,078,214 | 2/63 | Hofmann et al. | 260—319 XR |
| 3,084,167 | 4/63 | Rice | 260—268 XR |

IRVING MARCUS, *Primary Examiner.*

WALTER A. MODANCE, *Examiner.*